US008628107B2

(12) United States Patent
Harper et al.

(10) Patent No.: US 8,628,107 B2
(45) Date of Patent: Jan. 14, 2014

(54) DUAL-ATTACHMENT SYSTEM FOR A SWAY CONTROL HITCH

(75) Inventors: Jason Robert Harper, Provo, UT (US); Raymond L. Conger, Orem, UT (US); Joshua A. Jones, Provo, UT (US); Jed Anderson, Provo, UT (US)

(73) Assignee: Progress Mfg. Inc., Provo, UT (US)

( * ) Notice: Subject to any disclaimer, the term of this patent is extended or adjusted under 35 U.S.C. 154(b) by 214 days.

(21) Appl. No.: 12/829,230

(22) Filed: Jul. 1, 2010

(65) Prior Publication Data

US 2011/0156372 A1    Jun. 30, 2011

Related U.S. Application Data

(63) Continuation of application No. 12/689,953, filed on Jan. 19, 2010, now abandoned, which is a continuation of application No. 12/503,798, filed on Jul. 15, 2009, now abandoned.

(60) Provisional application No. 61/081,000, filed on Jul. 15, 2008, provisional application No. 61/082,141, filed on Jul. 18, 2008.

(51) Int. Cl.
*B60D 1/02* (2006.01)

(52) U.S. Cl.
USPC .......................................... 280/515; 280/504

(58) Field of Classification Search
USPC ............. 280/455.1, 405.1, 406.1, 406.2, 494; 188/196; 248/314, 562, 568, 636
See application file for complete search history.

(56) References Cited

U.S. PATENT DOCUMENTS

| | | | |
|---|---|---|---|
| 3,471,170 A | 10/1969 | Rendessy | |
| 3,801,133 A | 4/1974 | Thompson | |
| 3,957,286 A | 5/1976 | Goodwin | |
| 4,165,885 A | 8/1979 | Good et al. | |
| 4,306,734 A | 12/1981 | Swanson et al. | |
| 4,549,746 A | 10/1985 | Hager | |
| 5,660,409 A | 8/1997 | Hensley | |
| 5,707,071 A | 1/1998 | Prestidge et al. | |
| 7,025,370 B2 | 4/2006 | Anderson et al. | |
| 7,303,205 B2 | 12/2007 | Richardson et al. | |
| 7,967,320 B2 * | 6/2011 | Anderson et al. | .......... 280/455.1 |
| 2006/0049612 A1 | 3/2006 | Anderson et al. | |
| 2008/0122198 A1 | 5/2008 | Anderson | |
| 2008/0143078 A1 | 6/2008 | McCoy et al. | |
| 2008/0238038 A1 * | 10/2008 | Anderson et al. | ............. 280/504 |

* cited by examiner

*Primary Examiner* — Tashiana Adams
(74) *Attorney, Agent, or Firm* — Clayton, Howarth & Cannon, P.C.

(57) ABSTRACT

A trailer hitch system for equalizing trailer loads and reducing trailer sway. The trailer hitch system may include spring bars that may be attached to a hitch head using a trunnion style connection. The spring bars may be attached to the trailer using rigid brackets that reduce swinging of the spring bars. The rigid brackets having a plurality of contact points may include an upward extending portion for attaching to the trailer tongue, and a lateral extending portion for receiving the spring bars thereupon. The rigid brackets may include a spacing member and an attachment member.

39 Claims, 23 Drawing Sheets

DUAL-ATTACHMENT SYSTEM FOR A SWAY CONTROL HITCH

CROSS-REFERENCE TO RELATED APPLICATIONS

This application is a continuation of U.S. patent application Ser. No. 12/689,953, filed Jan. 19, 2010, which claims the benefit of U.S. patent application Ser. No. 12/503,798, filed Jul. 15, 2009, which claims the benefit of U.S. Provisional Application No. 61/081,000, filed Jul. 15, 2008, and U.S. Provisional Application No. 61/082,141 filed Jul. 18, 2008, which are hereby incorporated by reference herein in their entireties, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Invention

The present disclosure relates generally to trailer hitch systems, and more particularly, but not necessarily entirely, to a bracket system for trailer hitch systems for reducing trailer sway and/or equalizing the weight of the trailer.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing. An example is illustrated in FIG. 1.

Referring to FIG. 1, a side view is shown of a towing vehicle 10 towing a trailer 12 with a trailer hitch 14. It will be understood that the towing vehicle 10 may be any variety of vehicle known in the art, such as a truck, tractor or car, or any other variety of on-road or off-road vehicle, for example. Likewise, the principles of the present disclosure may be utilized with any variety of trailer 12 known in the art, such as camping trailers, boat trailers or cargo trailers, for example.

As is known in the art, the load from the trailer 12 may force the rear end of the towing vehicle 10 down and raise the front end of the towing vehicle 10 and thereby hitches may drag on the ground. Load equalizing systems, as discussed more fully below, have been used to distribute the load created by the trailer 12 on the towing vehicle 10 to thereby make the trailer 12 and towing vehicle 10 more level.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often exacerbate the sway problem making driving even more stressful and difficult.

Another common problem encountered when towing a trailer is "highway hop," or the bouncing that often happens to trailers on uneven roadways. This problem may be caused by uneven weight distribution. With ordinary ball-type hitches, most of the trailer tongue weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer, and may be joined to the trailer tongue using chains and/or brackets. The end of the spring arms opposite the hitch head may be lifted or loaded to place an upward force on the hitch head to thereby equalize the load exerted on the trailer hitch. Various mechanisms are known for use in association with a trailer hitch to reduce side sway of the trailer as well as to equalize loads.

Some prior art embodiments of the brackets for joining the spring bars to the trailer tongue have been formed as rigid members. FIG. 2 illustrates an example of the prior art, which shows an enlarged view of the hitch 14 on a break-away view of the trailer 12, the trailer 12 typically includes a trailer tongue 16 extending at a forward end of the trailer 12. The trailer tongue 16 may comprise a frame member 17. A coupler 18 typically will be located on an end of the tongue 16 for receiving a ball 20 of the hitch 14, in a manner known in the art. The ball 20 typically will be disposed on a hitch head 22 which typically will be attached to the tow vehicle 10 through a connector 24. A spring bar 26 typically will be joined to the hitch head 22 at one end, and to the frame member 17 of the trailer tongue 16 at an opposing end portion using a bracket 28. Typically, two spring bars 26 will be used, one on each side of the trailer tongue 16.

The spring bars 26 may be configured to provide an upward force on the hitch head 22 to equalize the distribution of the load and allow the towing vehicle 10 and trailer 12 to be more level. The spring bars 26 may also be beneficial for reducing sway of the trailer 12.

Referring now to FIG. 3, a perspective view is shown of one embodiment of the hitch system, indicated generally at 14, in accordance with the principles of the present disclosure. It will be understood that the hitch system 14 may be attached to the tow vehicle 10 and trailer 12 as shown in FIG. 1. The hitch 14 will typically include the hitch head 22 for receiving the ball 20. The hitch 14 will typically include a connector 24 for attachment to a tow vehicle 10. The hitch 14 will typically include spring bars 26 for applying an upward force on the hitch head 22 as discussed above. Brackets 28 may be provided to join the spring bars 26 to frame member 17 of the trailer tongue 16, as shown most clearly in FIG. 4.

An orthogonal side view of the bracket 28 is shown in FIG. 4. The bracket 28 must include a fastening mechanism for attaching the brackets 28 to the trailer tongue 16. The fastening mechanism will typically include one or more attachment members 44 and one or more fasteners 46 for joining the attachment members 44 to the trailer tongue 16. The attachment members 44 could be plates. The prior art typically uses a single fixation point 45 between the attachment member 44 and a support member 48. A single fixation point allows for off axis loads to cause rotation 77 about the point, which greatly increases wear.

Referring also to FIG. 5, the bracket 28 typically also included the support member 48 for supporting the spring bar 26. One embodiment of the support member 48 will be formed of a rigid member having a substantially "L" shaped configuration. The support will include an upward extending portion 50 for being attached to the bracket 28, and a lateral extending portion 52 for receiving the spring arm 26 thereon. The upward extending portion 50 will include one or more openings 51 for adjustably attaching the support member 48 with respect to the bracket 28 in an upward and downward direction. The bracket 28 will also include an adjustment mechanism 54 for use in combination with the openings 51 for adjusting a position of the support member 48 with respect to the bracket 28 holding the support member 48 in place.

The adjustment mechanism 54 will include a fastening member 56, such as a pin. The adjustment mechanism 54 will also include a support receiver 58 for receiving the upward extending portion 50 of the support member 48 such that the support member 48 can be moved with respect to the receiver 58 as the support member 48 slides up and down in the receiver 58.

A drawback of the prior art brackets formed as rigid members is that the fastening member 56 may wear and enlarge the openings 51 such that the bracket 28 does not provide stabilizing support to the spring bars 26 relative to the tongue 16. This looseness or play can result in greater and greater inertial loads to be experienced within the system until the bracket 28 has experienced decreased clamping ability and will allow the spring bars 26 to swing back and forth like a pendulum.

With reference to FIG. 6 the areas of wear will be discussed. FIG. 6 is a cutaway view of a bracket 28 and the frame member 17 of the trailer tongue 16. As the fastening member 56 works within the hitch system it will experience loading cycles consistent with towing. The fastening member 56 experiences these cycles where the openings 51 and the fastening member 56 make physical contact (shown by the W) and wear occurs. In some instances the wear can enlarge the hole to such a degree that bracket 28 may have decreased clamping ability. FIG. 7 further illustrates an instance where the opening has enlarged to a degree that the fastening member 56 no longer provides a pressure fit but is bottomed out at point B. Without the pressure fit the cyclic loading begins to have an inertial component thereby magnifying the loads. The prior art is characterized by these several disadvantages and other disadvantages that may be addressed by the present disclosure. The present disclosure minimizes, and in some aspects eliminates, the failures of the prior art, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
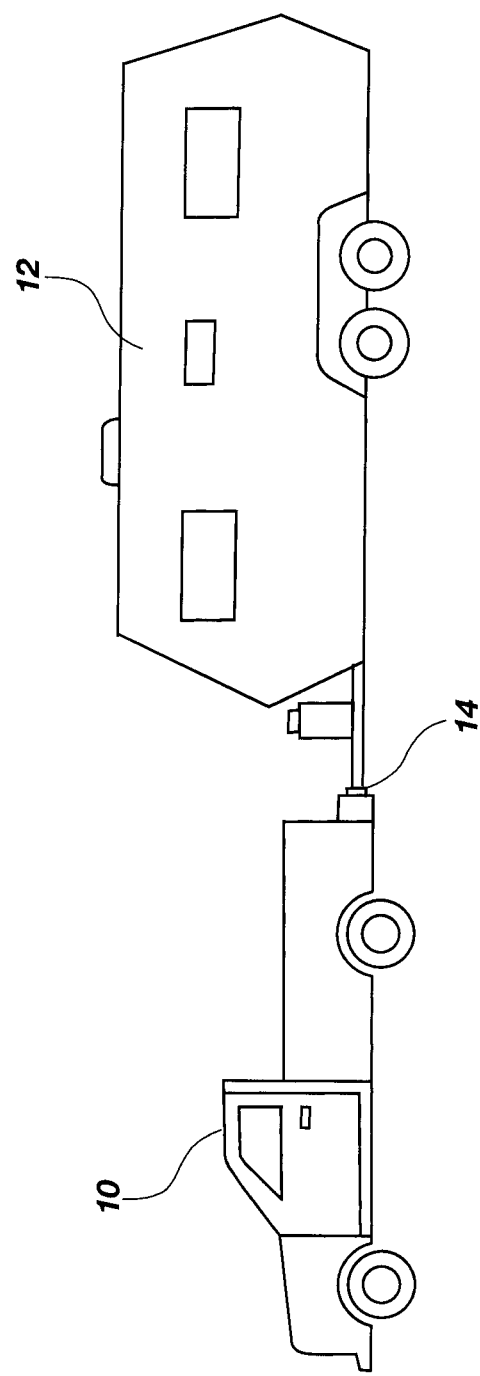
FIG. 1 is a side view of tow vehicle towing a trailer using a prior art trailer hitch.
Figure 2:
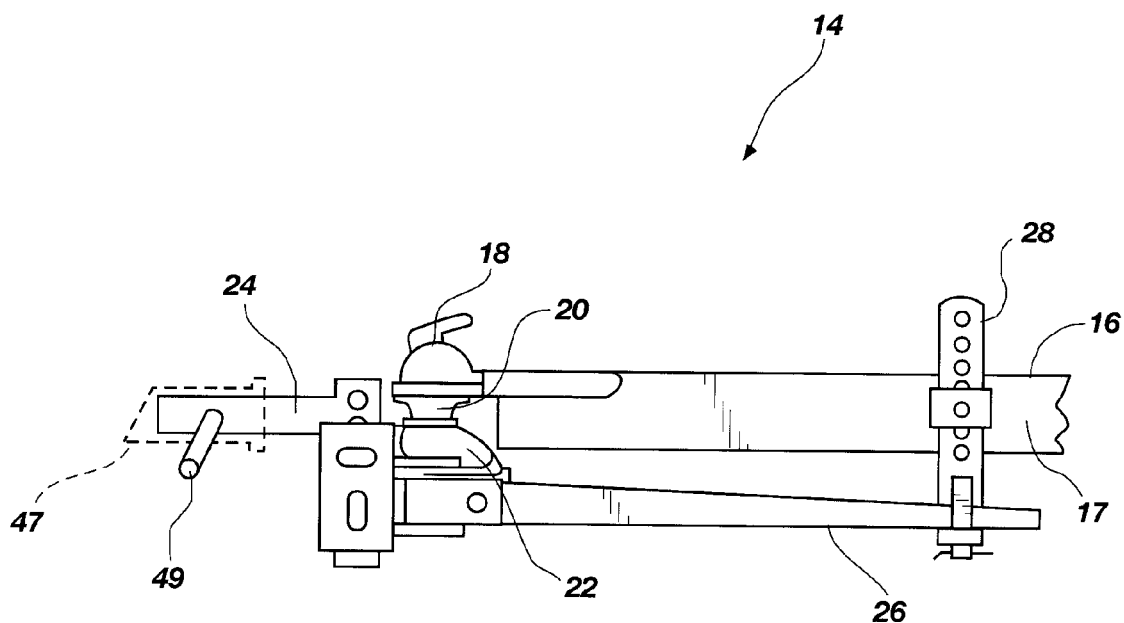
FIG. 2 is a side view of a prior art trailer hitch attached to a break-away portion of a trailer tongue.
Figure 3:
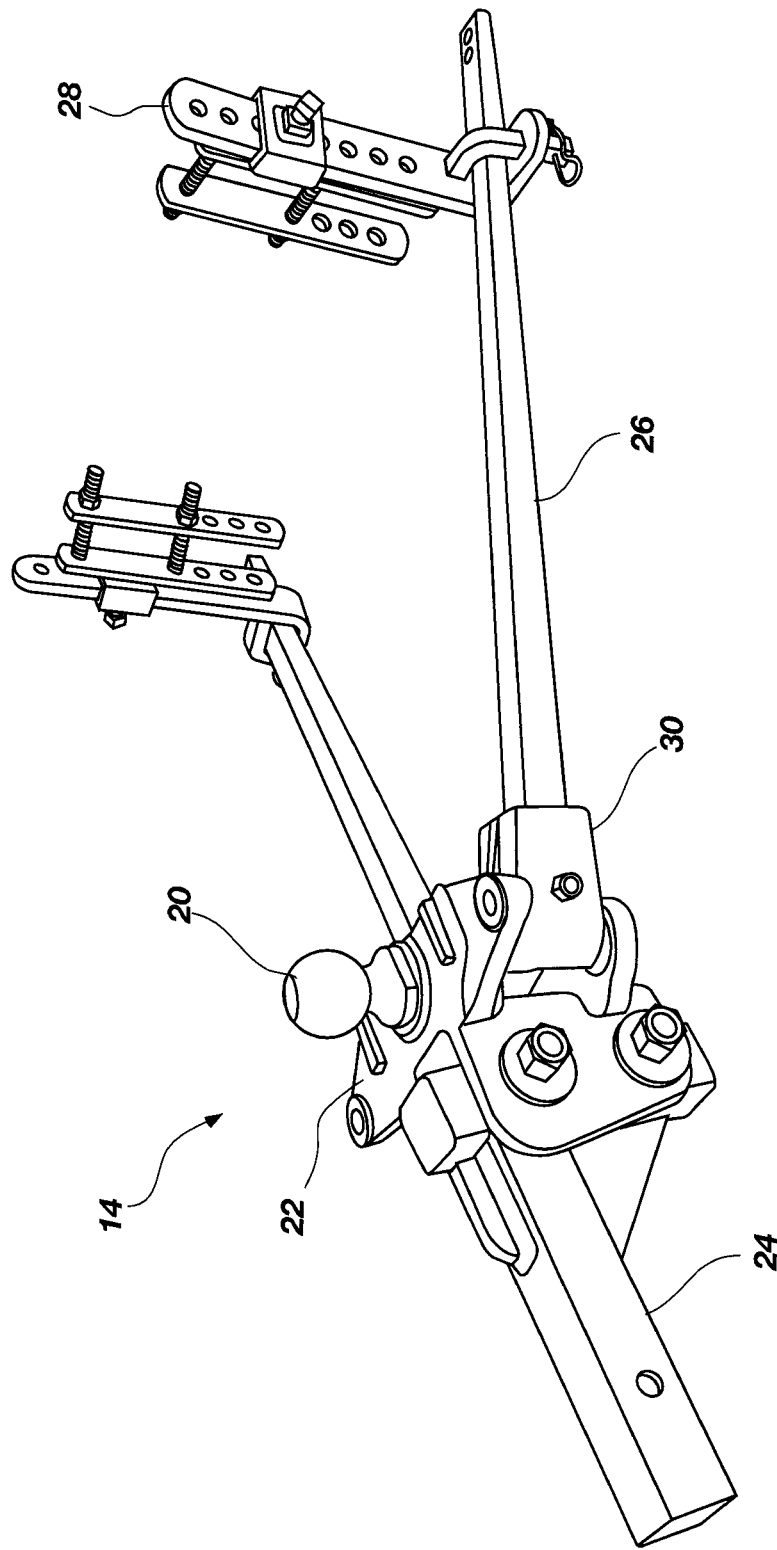
FIG. 3 is a perspective view of a prior art trailer hitch.
Figure 4:
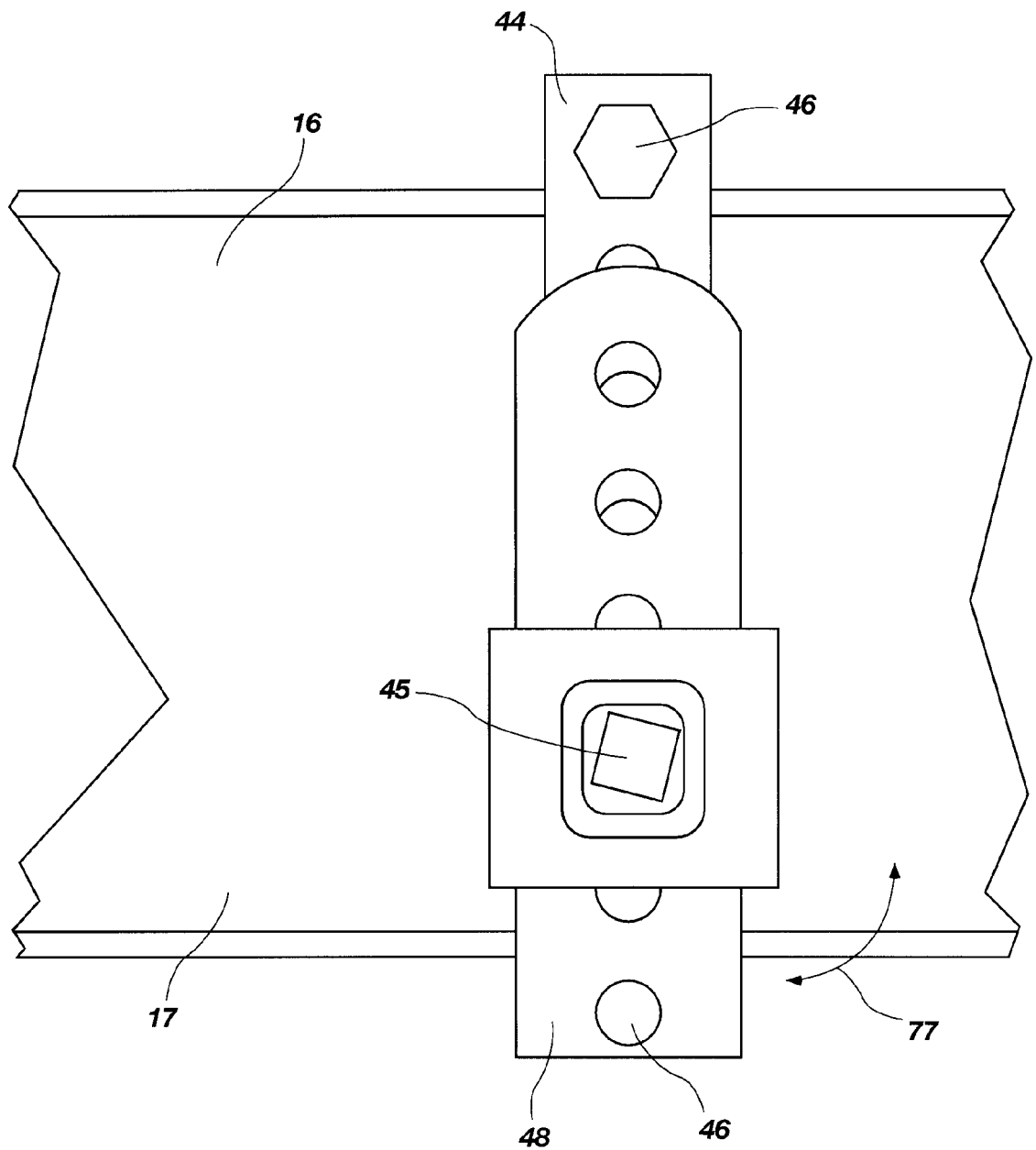
FIG. 4 is a side view of a prior art trailer hitch attached to a break-away portion of a trailer tongue.
Figure 5:
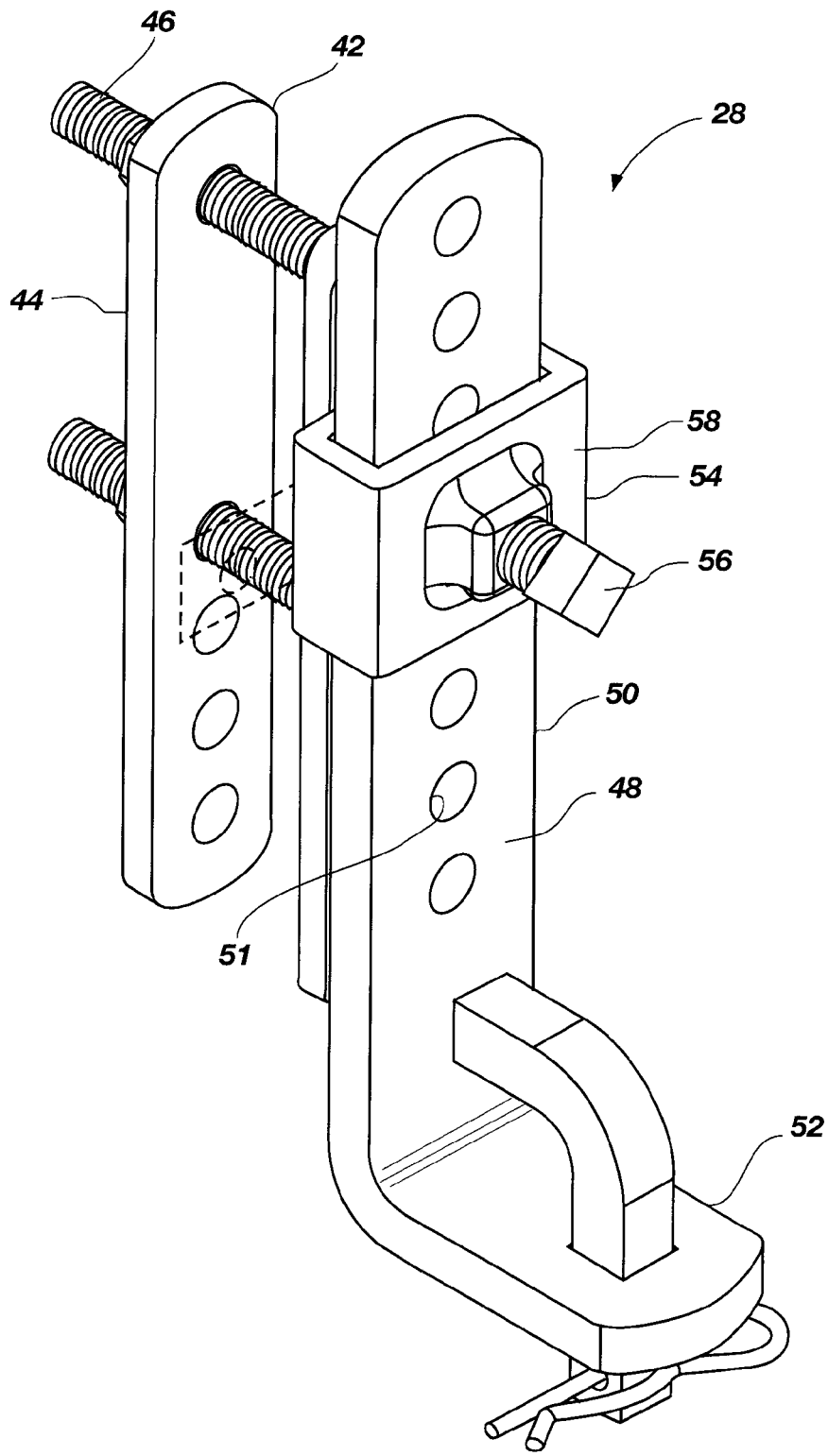
FIG. 5 is a perspective view of a prior art bracket for joining a spring bar to the trailer tongue.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structures and methods for providing a sway control hitch are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Figure 20:
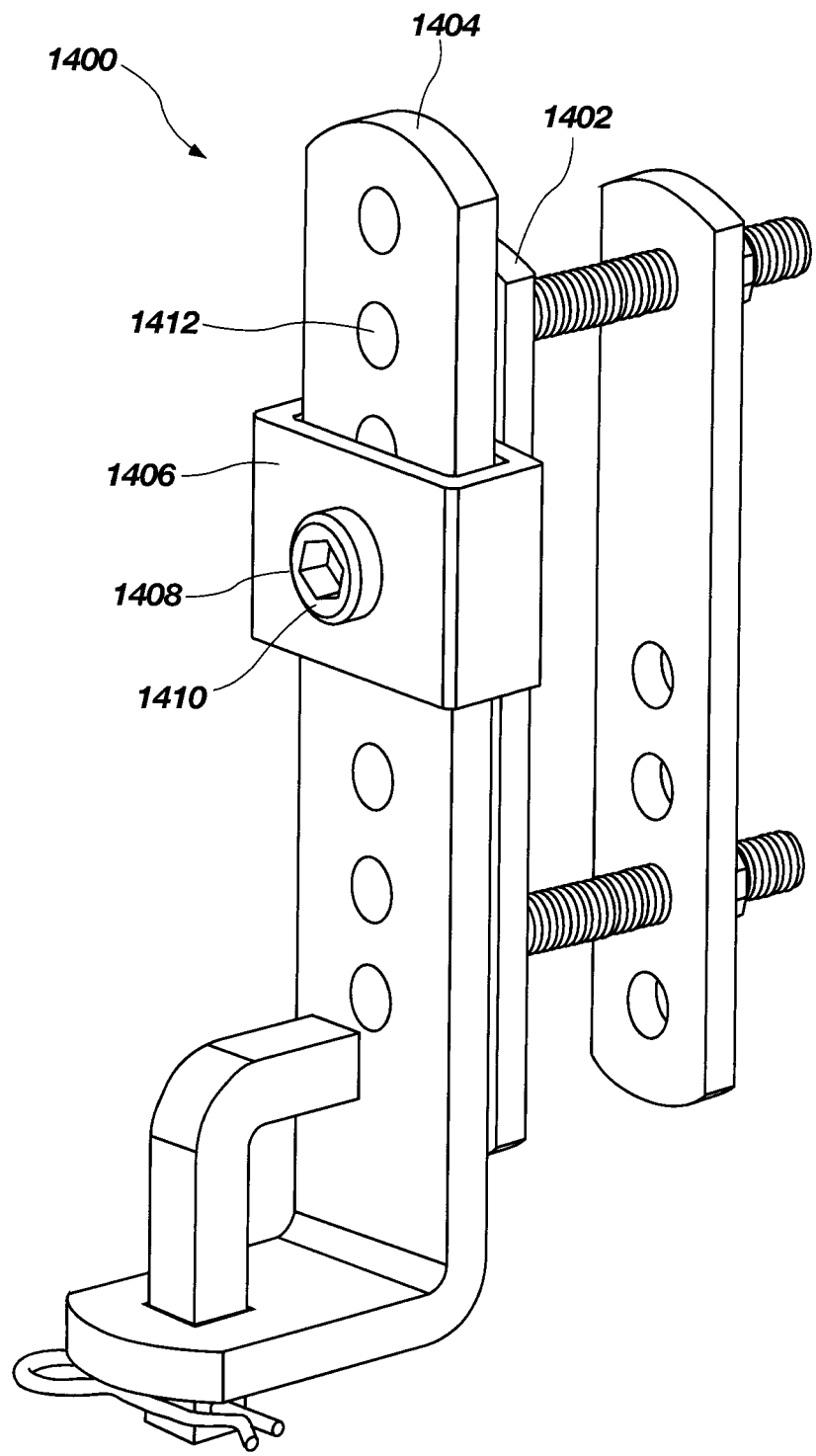
FIG. 20 is still another alternative embodiment of the trailer hitch system.

Applicants have discovered a trailer hitching system having a spring bar support member that may be installed onto one or more mounting studs that extend outwardly from an attachment member attached to a frame member of a trailer tongue (applicants have also discovered an embodiment that is alternative to the foregoing, as shown for example in FIG. 20). The attachment member may be secured to the frame member of the trailer tongue using a clamp-type mounting assembly. The spring bar support member may include a plurality of openings for selectively engaging the free ends of the one or more mounting studs to thereby provide a variable height adjustment feature. The one or more studs may each include a male threaded portion for receiving a threaded nut to thereby secure the spring bar support member to the attachment member. A spacing member may be interposed between the support member and the attachment member to provide clearance for fasteners used to in mounting assembly.

Figure 8:
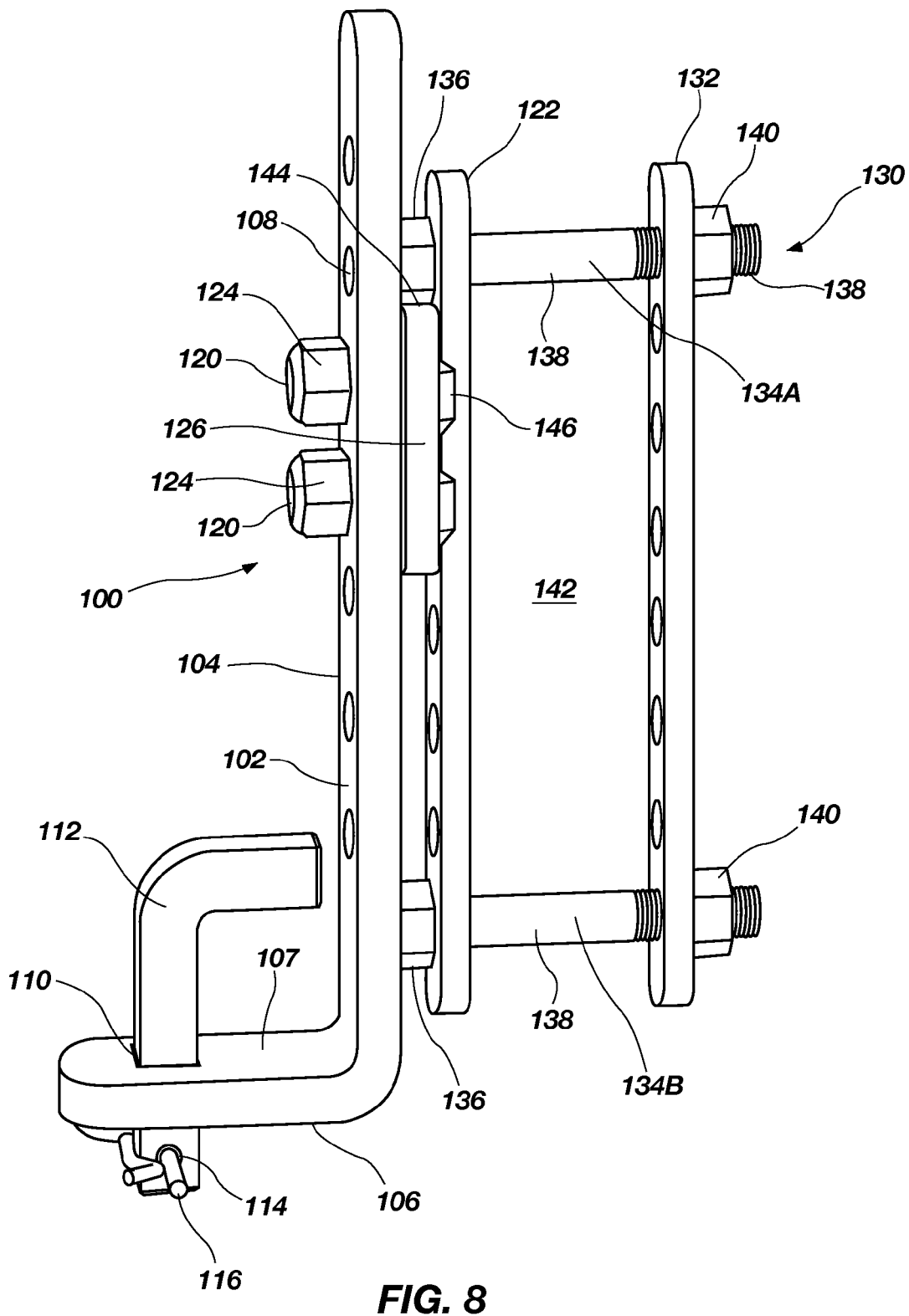
FIG. 8 is a perspective view of an embodiment of a bracket assembly for joining a spring bar to the trailer tongue, made in accordance with the present disclosure.

Referring now to FIG. 8, a spring bar support bracket assembly 100 pursuant to an embodiment of the present disclosure is shown. The bracket assembly 100 may include a spring bar support member 102. The support member 102 may be substantially L-shaped. The support member 102 may comprise an upward extending portion 104 and a lateral extending portion 106. A plurality of openings or bores 108 may be distributed along the upward extending portion 104 of the support member 102.

The lateral extending portion 106 may include a support surface 107 for supporting a spring bar (not shown). The lateral extending portion 106 may further comprise a slot 110 for receiving a retention member 112. In an embodiment of the present disclosure, the retention member 112 may be substantially L-shaped. The retention member 112 may be operable to prevent a spring bar (not shown) from laterally and/or vertically disengaging the support surface 107. The retention member 112 may include a bore 114 for receiving a locking pin 116. The locking pin 116 may ensure that the retention member 112 does not become removed from the slot 110.

The support member 102 may be removably mounted on a pair of studs 120 extending outwardly from an attachment member 122. It is to be understood that the pair of studs 120 may instead comprise three or more studs 120. A pair of locking members 124, such as threaded nuts or locking pins, may secure the support member 102 to the attachment member 122. In an embodiment of the present disclosure, the support member 102 may be mounted by inserting free ends of the studs 120 into a pre-selected pair of the plurality of openings 108. The pre-selected pair of the plurality of openings 108 may be selected to provide the desired height for the spring bar (not shown). That is, the pre-selected pair of the plurality of openings 108 may be selected based upon a desired height of the surface 107. A spacing member 126 may be interposed between the support member 102 and the attachment member 122. As will be explained in greater detail hereinafter, the spacing member 126 may include a pair of bores for the studs 120.

The attachment member 122 may be installed onto a frame member (not shown) of a trailer tongue (not shown) by a mounting assembly 130. The mounting assembly 130 may comprise a back attachment member 132. A pair of fasteners 134A and 134B, each having a head 136 and a shaft 138, and a pair of threaded nuts 140, may clamp the frame member (not shown) of the trailer tongue (not shown) in a space 142 between the attachment member 122 and the back attachment member 132. The attachment member 122 and the back attachment member 132 may each comprise a top mounting bore for the fastener 134A and a plurality of lower mounting bores for the fastener 134B.

In an embodiment of the present disclosure, the spacing member 126 may comprise a surface 144 for engaging the head 136 of the topmost fastener 134A. The engagement between the surface 144 and the head 136 may prevent the fastener 134A from rotating when the threaded nut 140 is installed onto a threaded end of the shaft 138 of the fastener 134A. In an embodiment of the present disclosure, the spacing member 126 may be joined to the attachment member 122 may have a weld 146.

Figure 9:
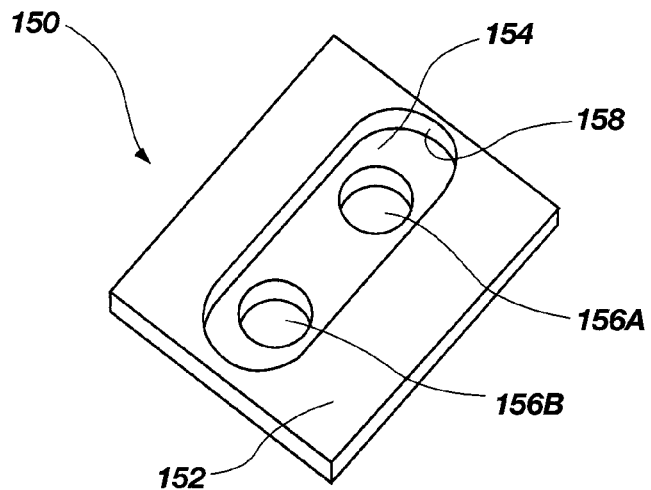
FIG. 9 is a perspective view of an embodiment of a spacing member similar to that shown in FIG. 8.

Referring now to FIG. 9, there is depicted a spacing member 150 according to an embodiment of the present disclosure. The spacing member 150 may comprise a surface 152 having a recess 154. A pair of bores 156A and 156B may be in communication with the recess 154. The recess 154 may comprise a surface 158 for engaging heads of studs 120 (see FIG. 8) to thereby prevent studs 120 from rotating. The surface 152 of the spacing member 150 may be joined against a surface of the attachment member 122 (see FIG. 8) such that the heads of studs 120 installed into the bores 156A and 156B are at least partially contained within the recess 154.

Figure 10:
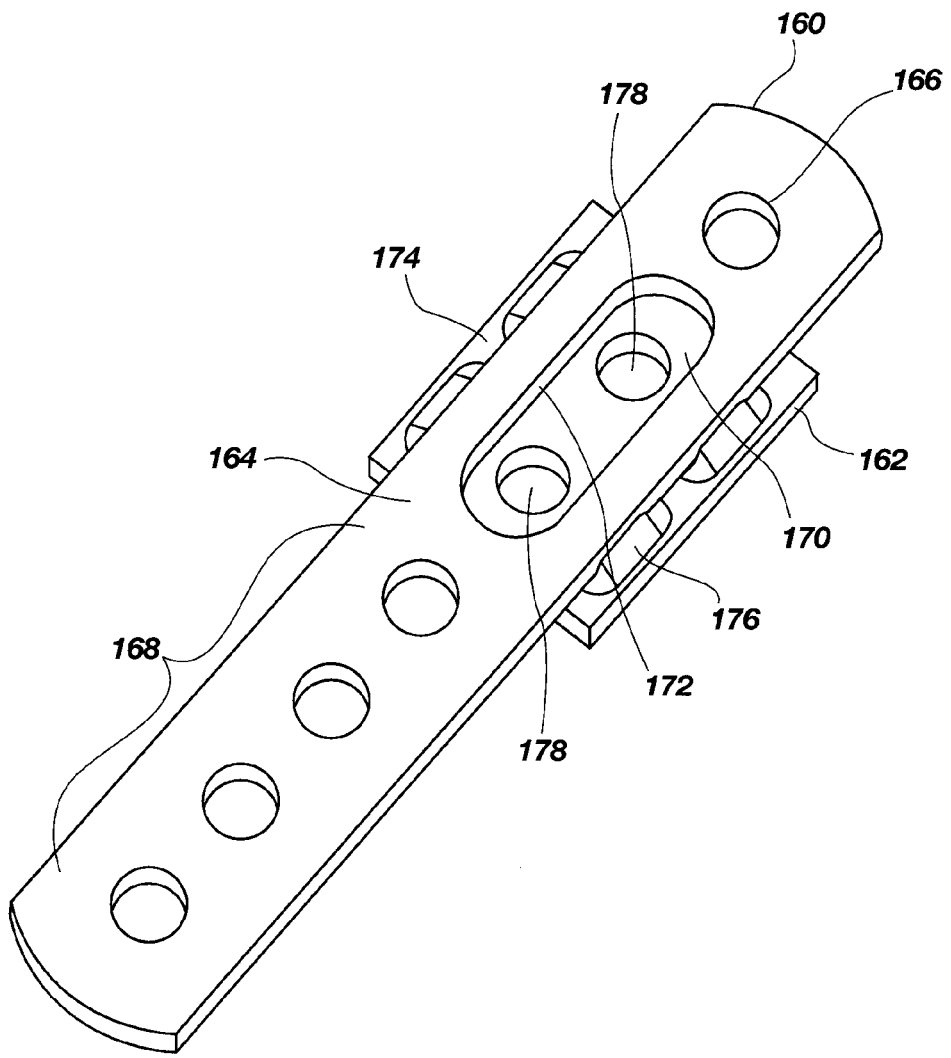
FIG. 10 is a perspective view of an embodiment of a spacing member similar to that shown in FIG. 9 attached to an attachment member similar to that shown in FIG. 8.
Figure 11:
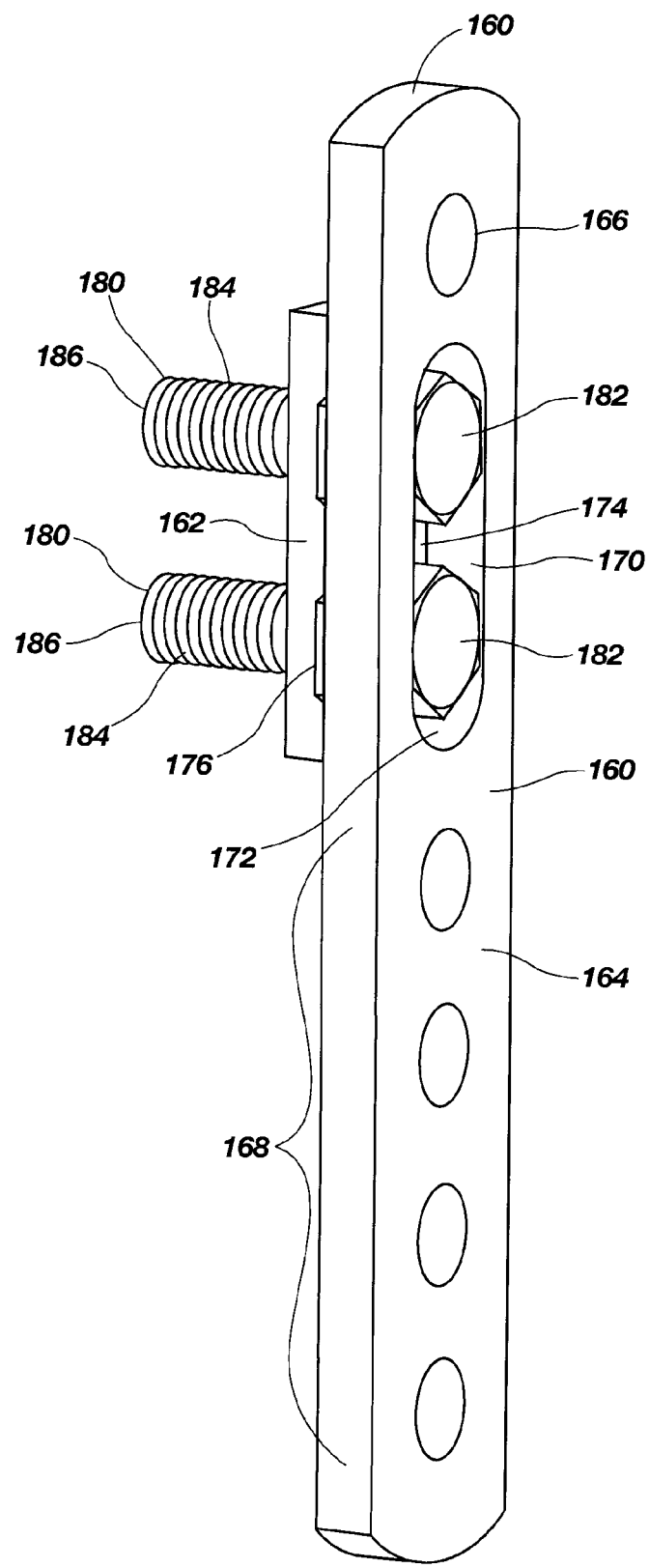
FIG. 11 is an embodiment of a spacing member and attachment member similar to that shown in FIG. 10, attached by studs.

Referring to FIGS. 10 and 11, there is depicted an embodiment of an attachment member 160 and a spacing member 162 suitable for use in joining a spring bar support member to a frame of a trailer tongue according to the present disclosure. The attachment member 160 may comprise a surface 164 configured and adapted for abutting against an outer surface of a frame member (not shown) of a trailer tongue (not shown). An upper mounting opening 166 and a plurality of lower mounting openings 168 may be adapted to receive fasteners for clamping the attachment member 160 to a frame member of a trailer tongue as shown in FIG. 8. A recess 170 may be formed in the surface 164 of the attachment member 160. The recess 170 may include a surface 172 defining a wall of the recess 170. The spacing member 162 may include a surface 172 that forms a bottom surface of the recess 170. The spacing member 162 may be joined to the attachment member 160 by a weld 176. The spacing member 162 may further comprise a pair of bores 178 in communication with the recess 170. It is to be understood that recess 170 may comprise an oblong-type shape as shown in FIG. 10, and it may also comprise any other suitable shape, including a double-hexagonal recess shape in which the opposing ends of the recess are shaped to form part of a hexagon.

As perhaps best seen in FIG. 11, a pair of studs 180 may be installed into the bores 178. In an embodiment of the present disclosure, each of the studs 180 may comprise a head 182, a shaft 184, and a free end 186. At least a portion of each of the shafts 184 of the studs 180 may be threaded to thereby engage a threaded nut. When installed, the head 182 of each of the studs 180 may be at least partially received into the recess 170. The surface 172 of the recess 170 may engage each of the heads 182 of the studs 180 to thereby prevent the studs 180 from rotating. The bores 178 may be dimensioned to allow passage of the shafts 184 of the studs 180 but not the heads 182 of the studs 180.

Figure 12:
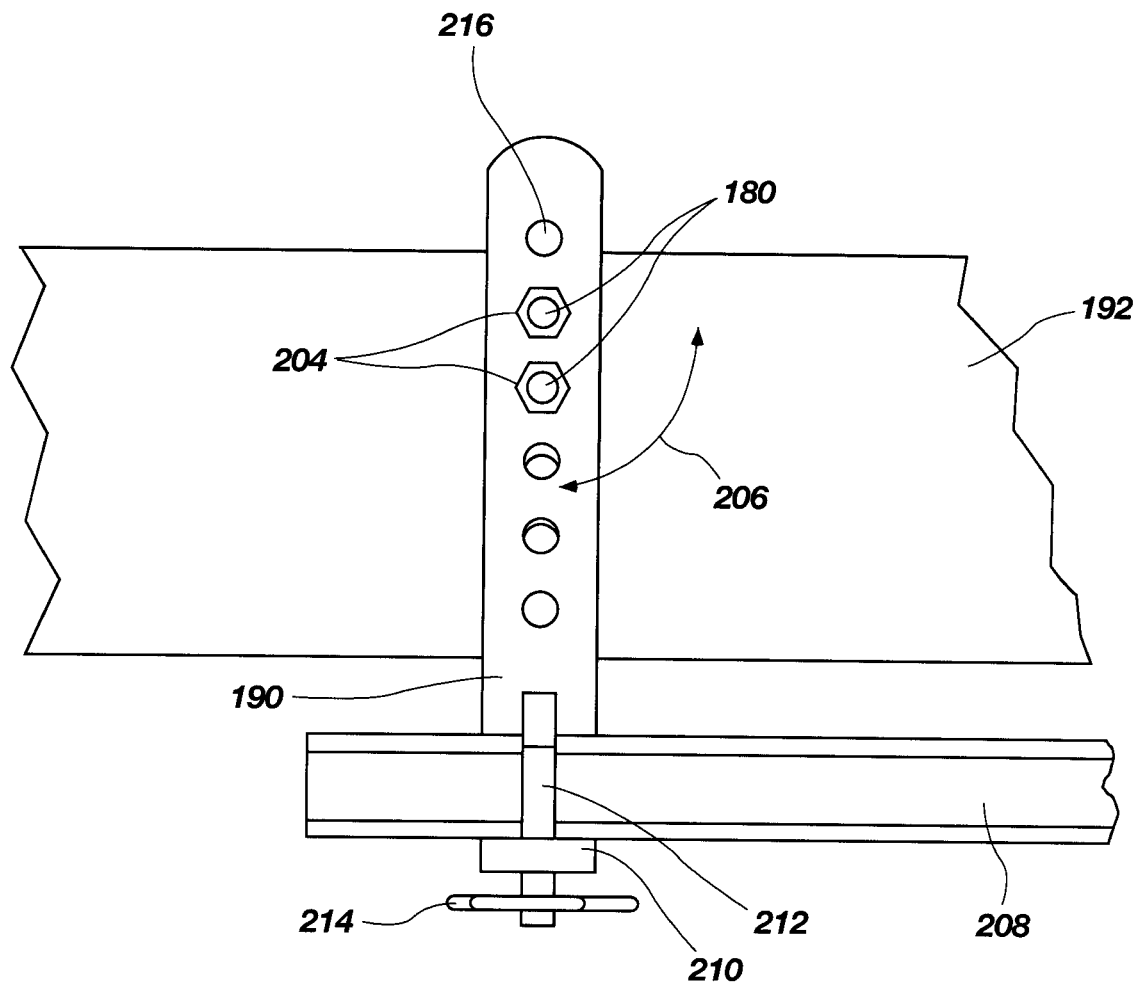
FIG. 12 is an embodiment of a trailer hitch and bracket system, made in accordance with the present disclosure.
Figure 13:
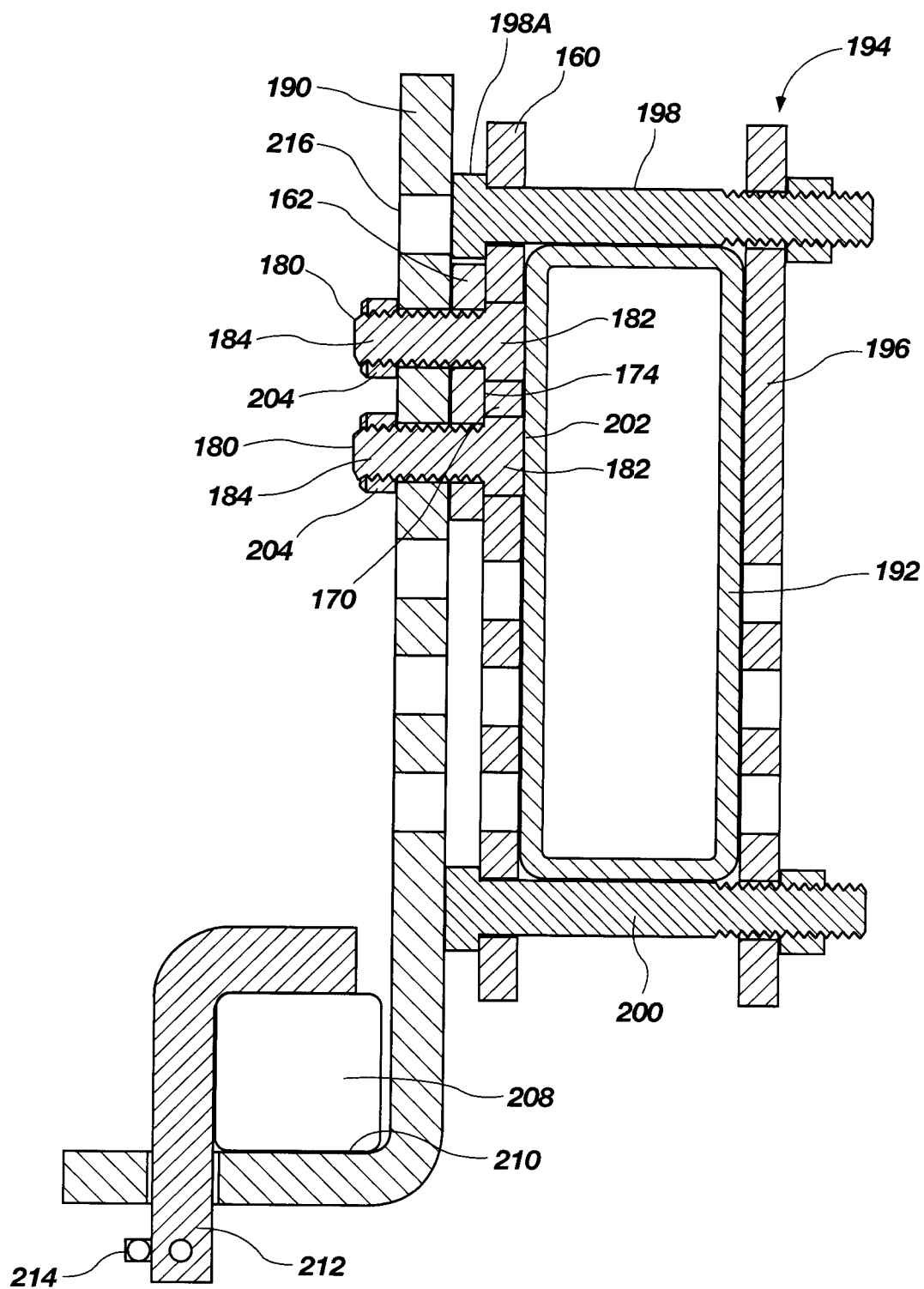
FIG. 13 is a cutaway view of the trailer hitch and bracket system of FIG. 12.

Referring now to FIGS. 12 and 13, there is depicted a spring bar support member 190 mounted on the studs 180. In particular, the attachment member 160 may be mounted to a frame member 192 of a trailer tongue. A mounting assembly 194 comprising a back attachment member 196, a top fastener 198 and a bottom fastener 200 may secure the attachment member 160 to the frame member 192. With the attachment member 160 installed to the frame member 192, a surface 202 of the frame member 192 may prevent the studs 180 from falling out of the recess 170. In particular, the heads 182 of the studs 180 are constrained by the surface 202 of the frame member 192 and the surface 174 of the spacing member 162.

A pair of threaded nuts 204 may be installed onto the shafts 184 of the studs 180 to thereby secure the spring bar support member 190 to the frame member 192. It will be appreciated the use of spaced apart studs 180 to mount the support member 190 prevents rotation of the support member 190 in the directions shown by an arrow marked with the reference numeral 206 in FIG. 12.

A spring bar 208 may be loaded onto a surface 210 of the support member 190. A retention member 212 and a locking pin 214 may prevent the spring bar 208 from disengaging the support member 190. A depth of the spacing member 162 may be approximately equal to a depth of a head 198A of the fastener 198. A plurality of openings 216 in the support member 190 may provide selectable height adjustment of the support member 190 with respect to the frame member 192.

Figure 14:
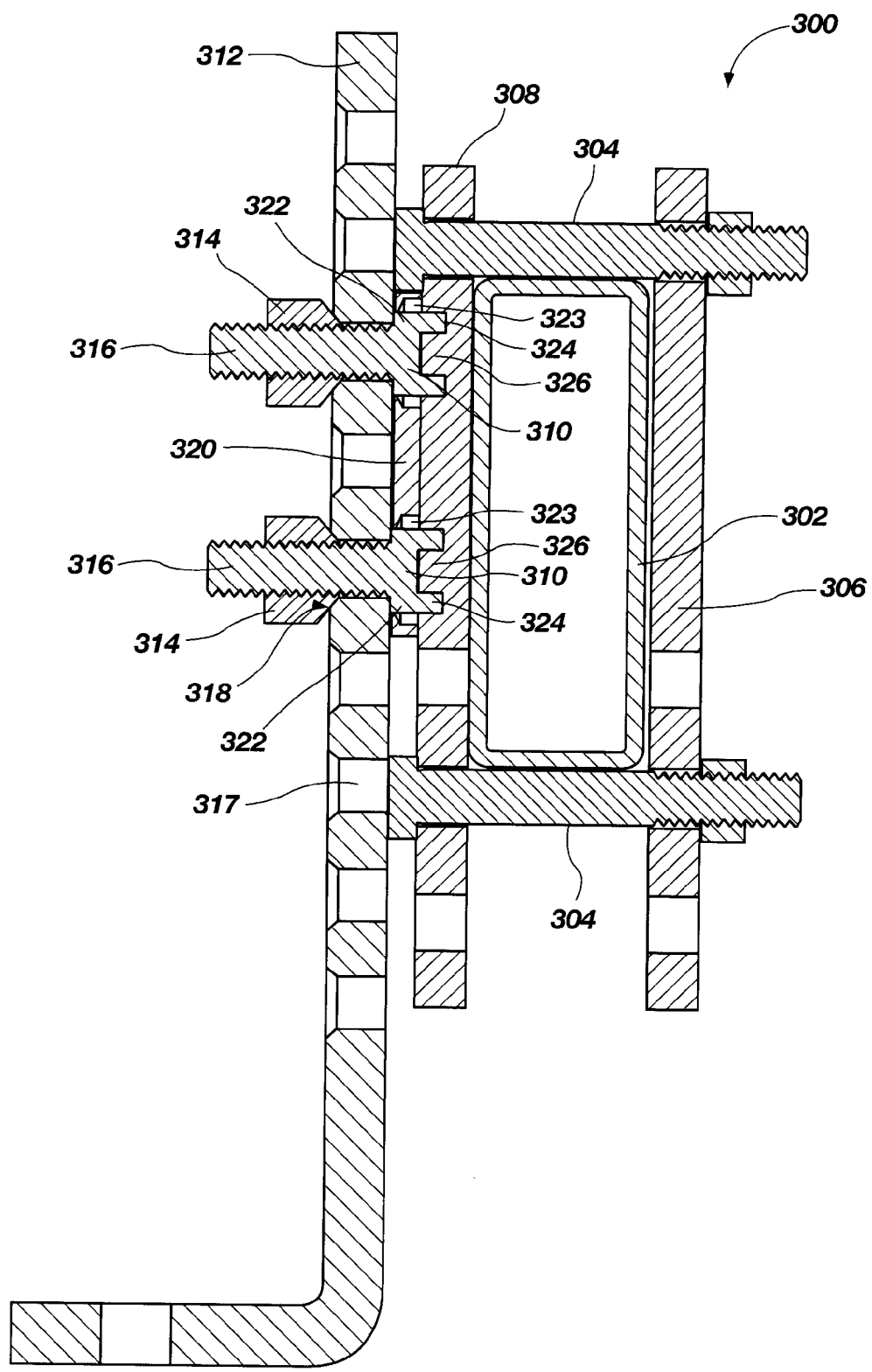
FIG. 14 is a cutaway view of an alternative embodiment of the trailer hitch and bracket system of FIG. 12 using a lug type nut.

Referring now to FIG. 14, there is depicted an embodiment of a spring bar support assembly 300 according to the present disclosure. The assembly 300 may be attachable to a frame member 302 of a trailer tongue. In particular, a pair of fasteners 304 and a back attachment member 306 may be utilized to secure an attachment member 308 to the frame member 302. The attachment member 308 may include a pair of studs 310 extending outwardly and in a direction opposite from the frame member 302. A spring bar support member 312 may be mounted on the studs 310. Lug nuts 314 may threadably engage threaded shafts 316 of the studs 310.

Figure 14A:
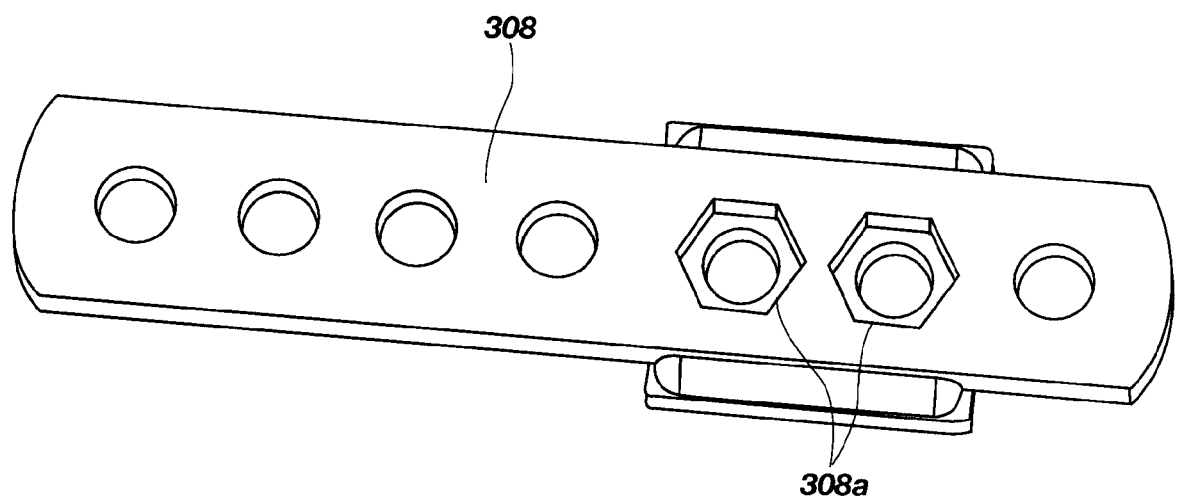
FIG. 14A is an illustration of an attachment member, and related structure, of FIG. 14.

The support member 312 may comprise a plurality of openings 317. Pairs of the plurality of openings 317 may selectively engage the studs 310 to thereby provide variable height selection of the support member 312 with respect to the frame member 302. The openings 317 may each comprise a counterbore 318 for centering the lugs 314. A spacing member 320 may be interposed between the support member 312 and the attachment member 308. Each of the studs 310 may comprise a head 322, installed in a recess 323, having a portion 324 that engages a portion 326 of the attachment member 308 to thereby prevent rotation of the studs 310. For example, as shown most clearly in FIG. 14A, the heads 322 may comprise hex-shaped heads that are constrained from rotating by a hexagonal counter-sunk slot shape 308a in the attachment member 308. It is to be understood that the studs 310 could alternatively be weldable and therefore non-removable such that the hexagonal counter-sunk slot shapes 308a are unnecessary and need not be included (see FIG. 16 and related description).

Figure 15:
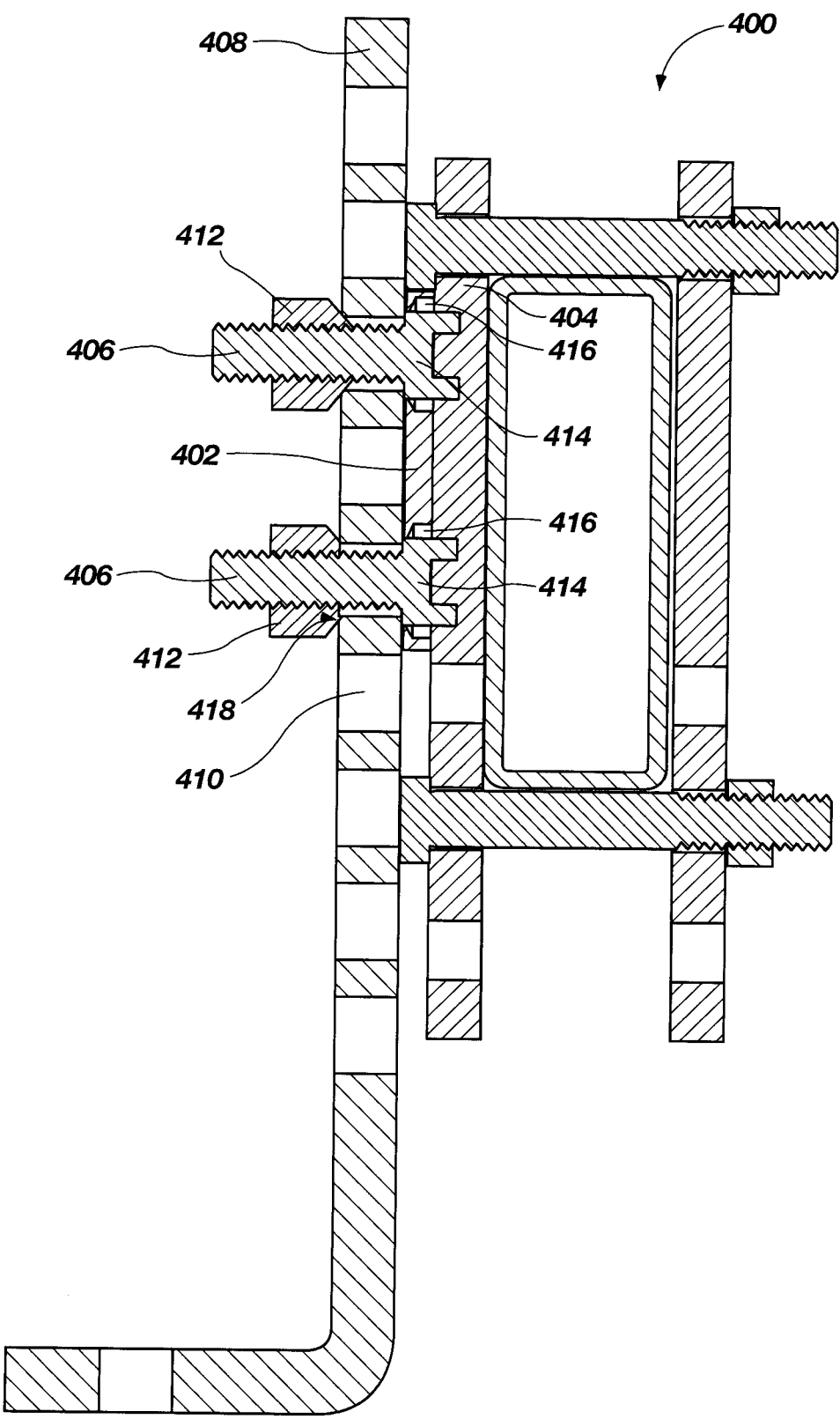
FIG. 15 is a cutaway view of another alternative embodiment of the trailer hitch and bracket system of FIG. 12.

With reference to FIG. 15 the mechanical communication of the trailer tongue and an embodiment of the bracket assembly using a lug type nut will be discussed. FIG. 15 illustrates a cut-away frontal view of a trailer tongue bracket assembly 400. A spacing member 402 may be welded to the main portion of an attachment member 404. A stud 406, or a plurality of studs, may be used for assembling the bracket assembly 400 and may be configured to pass through the attachment member 404, the spacing member 402 and a spring bar support member 408. The support member 408 may have a plurality of openings 410 for receiving studs 406 there through. The studs 406 may use a lug-nut 412 for receiving a threaded portion of the studs 406 and thereby removably fixing the support member 408 to the spacing member 402. In this view, it cannot be seen that the hexagonal-shaped heads 414 (sometimes referred to a "hex-shaped heads") of the studs 406 are constrained from rotating by a counter-sunk slot 416 (slot 416 could be a hexagonal shape or some other suitable shape) in the attachment member 404. Lug-nuts 412 may have a tapered portion 418 that mechanically communicates with the leading edge of an opening 410 to center and locate the support member 408 relative to the studs 406 which may further prevent the support member 408 from pivoting about the studs 406. The support member 408 may have variable height adjustment with respect to the frame member 420.

Figure 16:
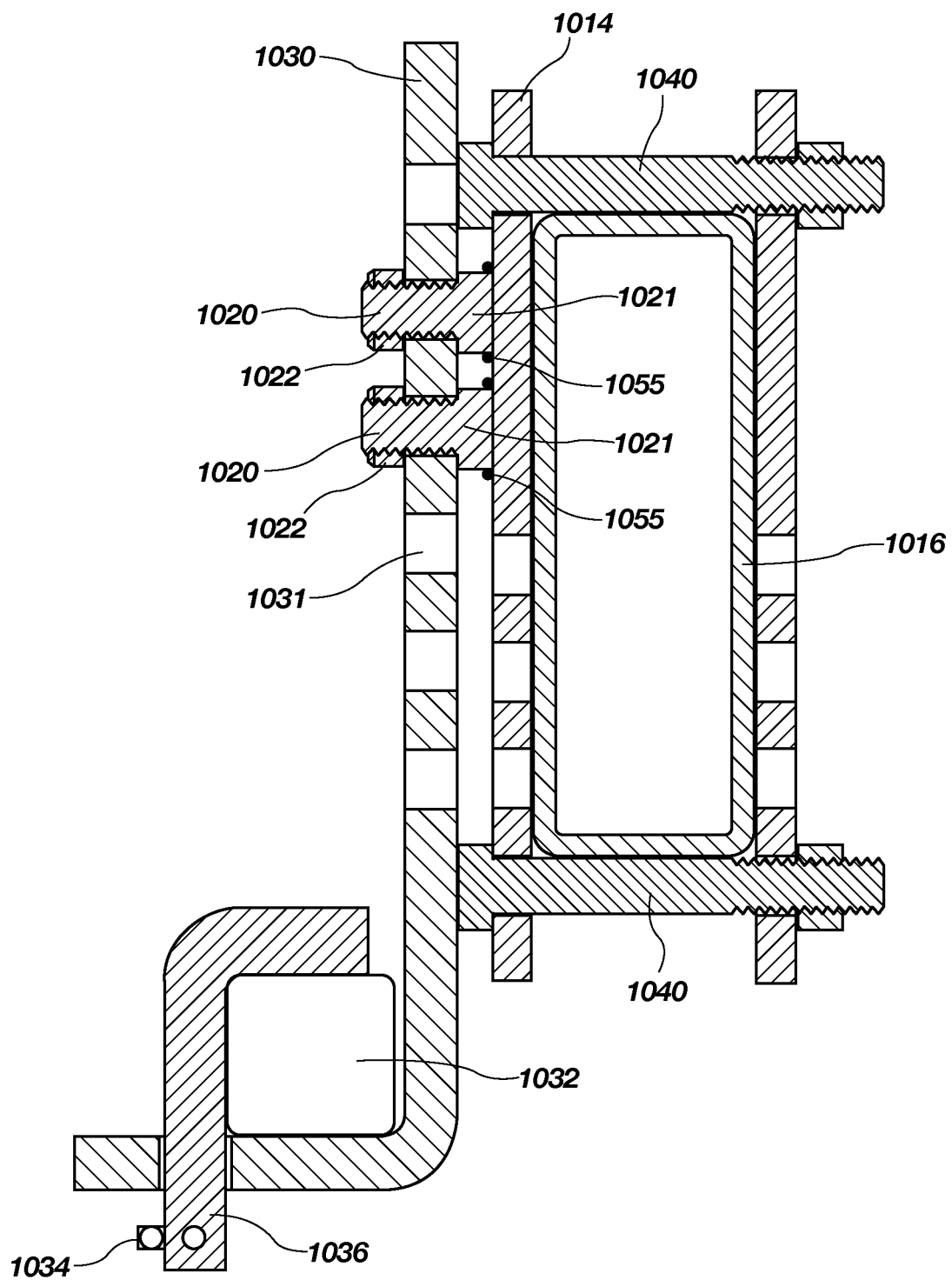
FIG. 16 is a cutaway view for this alternative embodiment of the trailer hitch and bracket system.

With reference to FIG. 16 the mechanical communication of the trailer tongue and an embodiment of the bracket assembly using attached fasteners will be discussed. FIG. 16 illustrates a cut-away frontal view of the trailer tongue bracket assembly. A stud 1020, or a plurality of studs may be fixed directly to an attachment member 1014 using a weld 1055. Each stud 1020 may comprise a head portion 1021 generally having a larger diameter than the other portions of the stud 1020. A weld 1055 may be applied at the joint of head portion 1021 and the attachment member 1014.

In an embodiment, a stud 1020 may be of the same diameter throughout its length and threaded from extreme end to extreme end. In such an embodiment, a receiving opening in the attachment member 1014 may be provided and threaded to receive the threads on the stud 1020. The stud 1020 may then be welded in place. In an embodiment, a stud may be of the same diameter throughout its length and may have a portion that is not threaded. In such an embodiment, a receiving opening in the attachment member 1014 may be provided to receive the non-threaded portion of the stud 1020. The stud 1020 may then be welded in place. The support member 1030 may have a plurality of openings 1031 for receiving studs 1020 there through. The studs 1020 may be constrained from rotating by the weld 1055. A recessed slot may also be provided for holding the studs 1020 or studs 1020. The recess may then be filled in with weld material.

A thickness of a head portion 1021 of studs 1020 may function similar to a spacing member in other embodiments. Other spacing objects may be provided for spreading the clamp loading because over-tightening the nuts 1022 may cause the support member 1030 to clamp against the heads of fasteners 1040 which are substantially spaced apart, and this may make the support member 1030 deform inward.

Figure 17:
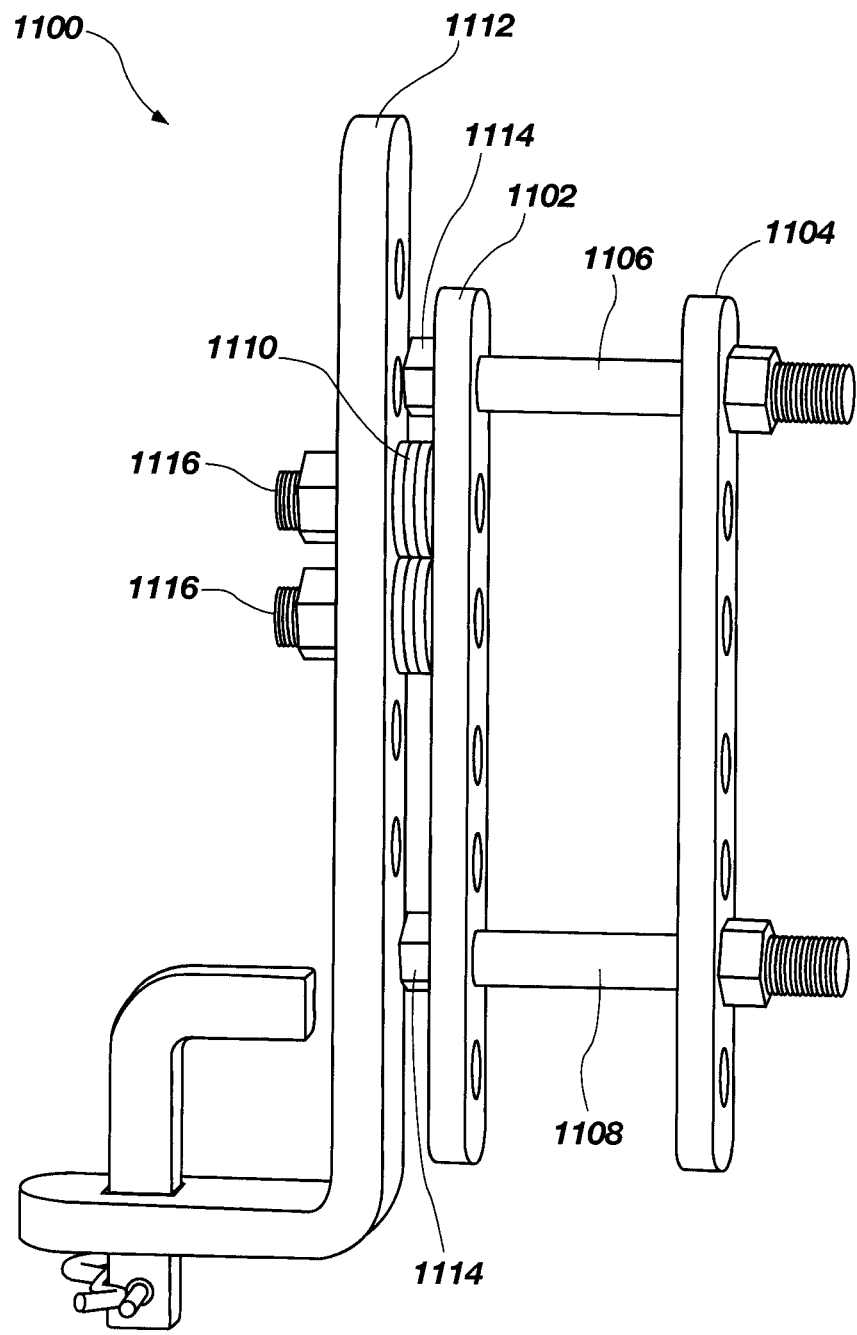
FIG. 17 is yet another alternative embodiment of the trailer hitch system.

Referring now to FIG. 17, there is depicted a bracket assembly 1100 for joining a spring bar (not shown) to a frame member of a trailer tongue (not shown). The assembly 1100 may comprise an attachment member 1102 mounted to the frame member of the trailer tongue by a back attachment member 1104 and fasteners 1106 and 1108. Instead of a solid spacing member, the assembly 1100 may comprise a plurality of washers 1110 for spacing a support member 1112 and the attachment member 1102. A desired number of washers 1112 may be used to create an effective spacing to help provide a solid surface immediately opposite of the nuts 1114 on studs 1116 of the support member 1112 to clamp against. Ideally, the total spacing by these washers 1110 will have a thickness greater than the thickness of the heads 1114 of the fasteners 1106 and 1108. Or, the spacing by the washers can equal the thickness of the heads 1114, so that the support member 1112 presses against the two stacks of washers 1110, and the two heads 1114.

The studs 1116 of the assembly 1100 are attached in a different method that does not require a "loose" recess in the attachment member 1102. Instead, there are means for rigidly fixing the studs 1116 to the attachment member 1102. In an embodiment of the present disclosure, headless studs 1116 may be fixed to the attachment member 1102. Threaded bores may be created in the attachment member 1102 that the threaded studs 1116 can engage. It may be helpful to do some welding to fix the studs 1116 to the attachment member 1102 to prevent any further rotation once installed.

In an embodiment of the present disclosure, a temporary recess of any size or shape may be created, such that studs 1116 of any variety (headless with threads, headless with a non-threaded or pegged end, complete bolt with a head of any variety) can be filled into the recess. After insertion, the empty space around the studs 1116 may be back-filled with weld, and then ground flat. This essentially creates an attachment member 1102 with built-in studs 1116 that are integral with the attachment member 1102.

Even with integrated studs 1116, there may still exist a need for some spacing between the support member 1112 and the attachment member 1102 (because the heads 1114 stick out) and the washers 1110 may provide the necessary spacing. Note that even with embodiments using a sold spacing member (instead of washers), these just variations for fitting or attaching studs to an attachment member can be utilized. In other words, the embodiments using a solid spacing member may utilize only loose-fitting studs that are held from rotating. It may also involve these variations of integrating or manufacturing the studs right into an attachment member. It will be appreciated that washers 1110 may be considered as spacing members.

Figure 18B:
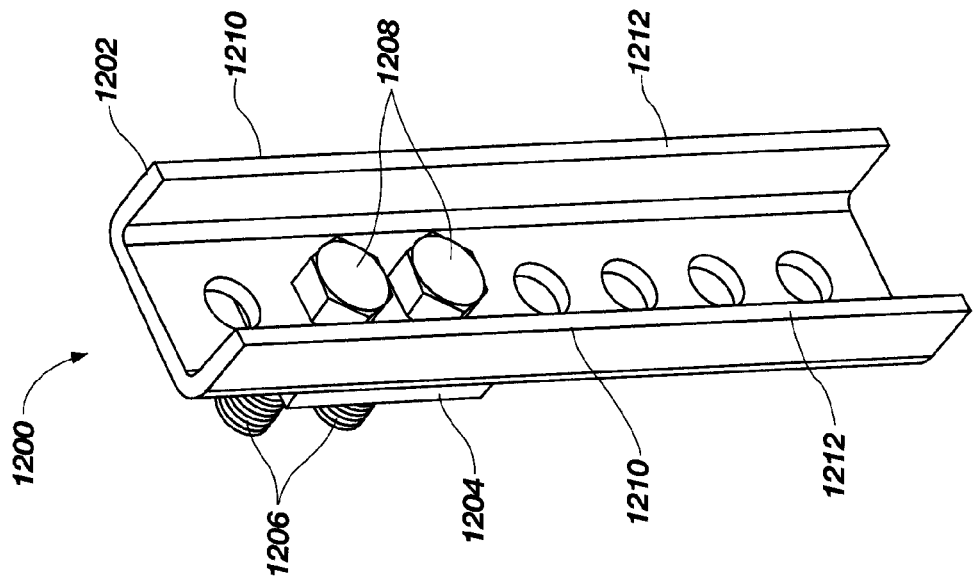
FIGS. 18A and 18B is yet another alternative embodiment of the trailer hitch system.
Figure 18A:
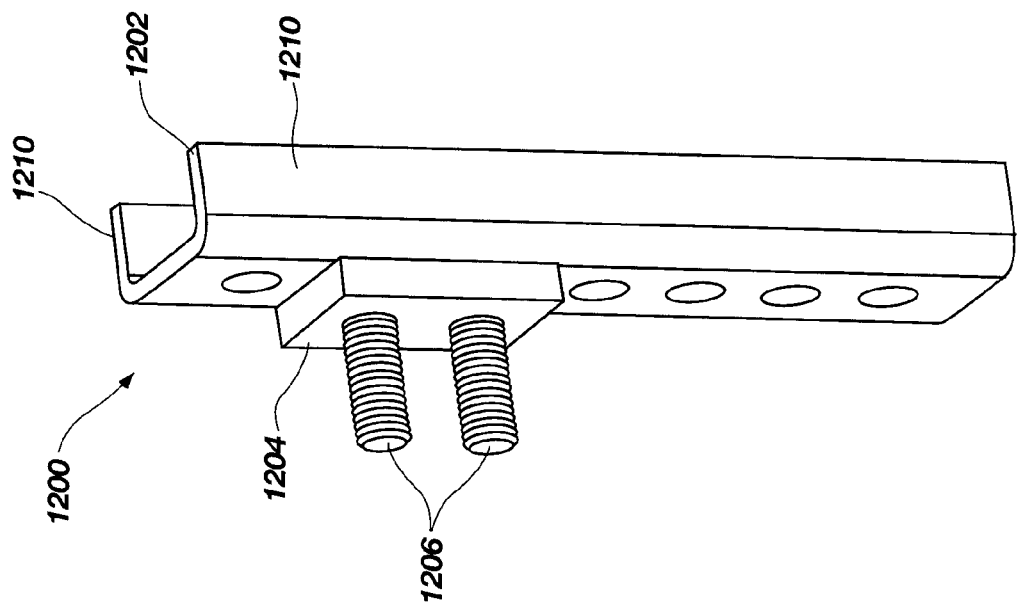

Referring now to FIGS. 18A and 18B, there is shown an attachment member 1200 suitable for use with a spring bar support bracket assembly. The main difference between the attachment member 1200 and the attachment members described above, may be that the attachment member 1200 may be formed from a C-channel 1202 instead of solid/flat steel bar. This C-channel 1202 may include a spacing member 1204 that may be welded, or may be fixedly or unfixedly attached upon full installation. Studs 1206 may extend from the spacing member 1204. In an embodiment of the present disclosures, washers can replace the spacing member 1204, or heads 1208 of the studs 1206 may be welded to the C-channel 1202 and function as spacers.

Side walls 1210 of the C-channel 1202 may effectively create a recessed channel of open space on the back of this attachment member 1200, which allows the heads 1208 of the two studs 106 to reside without blocking a tight clamping of the attachment member 1200 against a frame member of the trailer tongue. Instead, edges 1212 of the side walls 1210 will make direct contact with the frame member of the trailer tongue.

The studs 1206 may be loose and inserted through holes in both the attachment member 1200 and a spacing member (not shown). Or, the studs 1206 may be welded inside the recessed channel around their heads 1208 (best seen in FIG. 18b, but no welds are shown). Or, provisions may be made to create fixation points or interference fits that prevent the heads 1208 of the studs 1206 from rotating when tightening the nuts (not shown). For example, a strip of metal may be welded near the holes for the studs 1206 such that one or more edges of the heads 1208 abut the metal and will be prevented from pivoting.

As shown most clearly in at least FIGS. 11, 13, 14, 15, 16 and 18b, the studs may each comprise a head, such as heads 182 of studs 180 as shown in FIG. 11, for example, or heads 322 of studs 310 as shown in FIG. 14, or heads 414 of studs 406 in FIG. 15, or head portions 1021 of studs 1020 as shown in FIG. 16, or heads 1208 of studs 1206 as shown in FIG. 18b, Further, as shown most clearly in at least FIGS. 11, 13, 14, 15, 16, 17, and 18b, the head of the stud may reside between at least a portion of the support member, and the back attachment member of the mounting assembly, still further, as shown most clearly in FIG. 18b (as explained above in the discussion of the attachment member 1200 of FIG. 18b as an alternative to the attachment members shown in other embodiments) and thus in reference to the embodiments of at least FIGS. 8-17, and also as shown in at least FIGS. 11, 13, 14 and 15), the attachment member, and the back attachment member of the mounting assembly.

Figure 19:
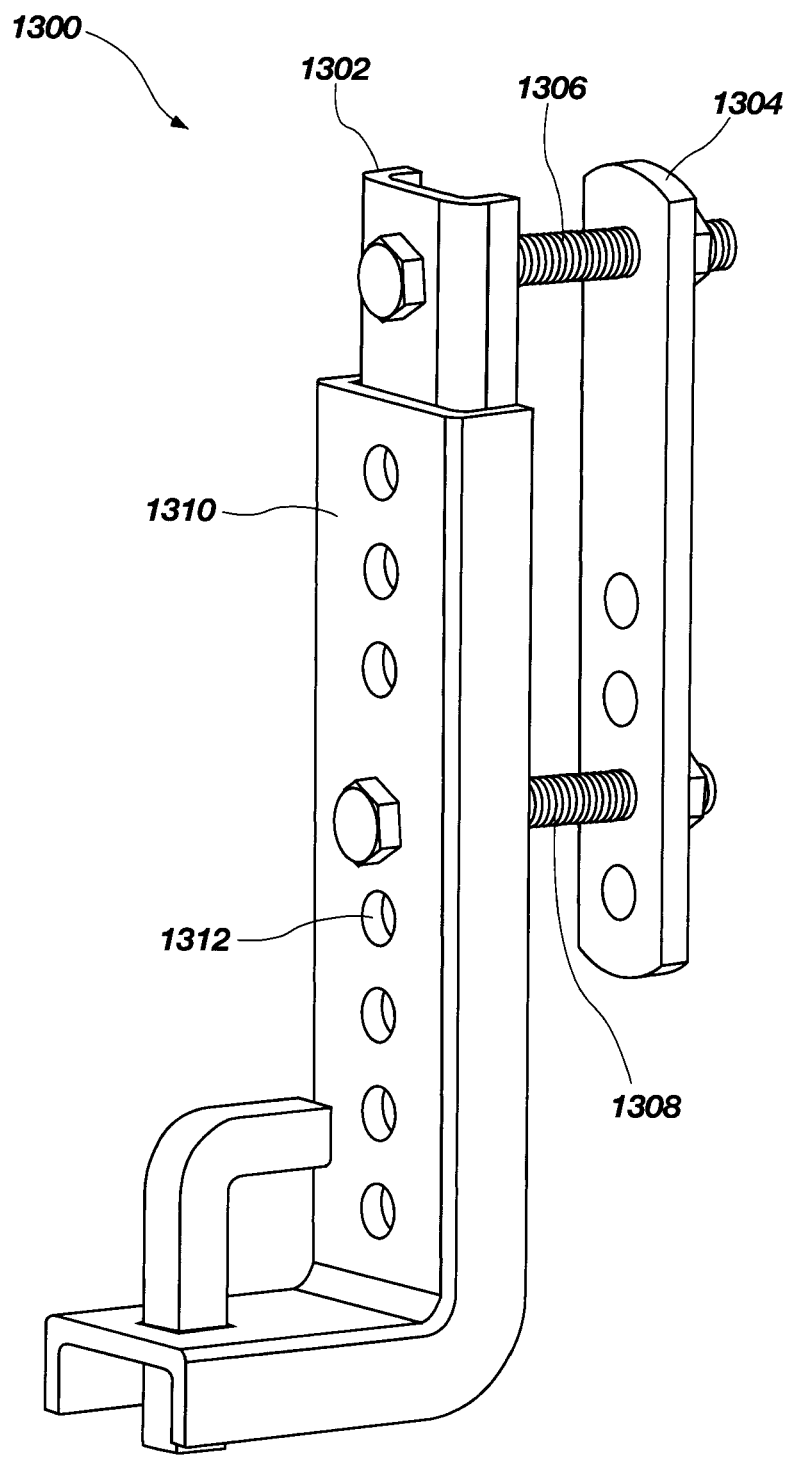
FIG. 19 is yet another alternative embodiment of the trailer hitch system.

Referring now to FIG. 19, there is depicted an embodiment of a spring bar support bracket assembly 1300. The assembly 1300 may comprise an attachment member 1302 mounted to a frame member (not shown) of a trailer tongue (not shown) using a back attachment member 1304 and fasteners 1306 and 1308. A spring bar support member 1310 may be mounted to the attachment member 1302. Both the attachment member 1302 and the support member 1310 may be formed from C-channel lengths of steel that will mate snugly together. The support member 1310 may be joined to the attachment member 1302 by sharing at least one of the same fasteners 1308 that clamp attachment member 1302 and the back attachment member 1304 together around a frame member of a trailer tongue.

For example, the support member 1310 may be positioned at a desired height until openings 1312 in the support member 1310 align with openings in the attachment member 1302. The fastener 1308 may be inserted through an opening 1312 in the support member 1310 and then through openings in the attachment member 1302 and the back attachment member 1304.

It will be appreciated that depending on the desired height of the support member 1310, some positions may allow both fasteners 1306 and 1308 to pass through the openings 1312 in the support member 1310. But as shown in FIG. 19, some positions of the support member 1310 may only allow one of the fasteners 1306 and 1308 to pass through the support member 1310. The mating of the C-channel components of the support member 1310 and the attachment member 1302 may also help prevent pivoting of the support member 1310 about the connection point of the fasteners 1306 and 1308 by virtue of the side walls in an interference fit.

Referring now to FIG. 20, there is depicted an embodiment of a spring arm support bracket assembly 1400 according to the present disclosure. The assembly 1400 may comprise an attachment member 1402 and a spring arm support member

1404. A hole may be drilled out in an outer wall 1408 of a receiver 1406. The diameter of this hole may be sized to let the head of a round-headed bolt 1410 to fit through it, until the underside of this round head may clamp directly into the surface of the support member 1404 immediately around an alignment hole 1412 in the support member 1404.

The diameter of a shaft of the threaded bolt 1410 may be dimensioned to extend through the holes 1412 in the support member 1404 (non-threaded holes). A threaded hole or bore (not shown) may be created in the attachment member 1402. Specifically, this threaded bore may go through the back wall of the receiver 1406, as well as through the attachment member 1402 that the receiver 1406 is welded to. This round-headed bolt 1410 may also extend through a hole 1412 in the support member 1404 and engage the threaded bore in the attachment member 1402 until the support member 1404 is tightly clamped.

Figure 6:
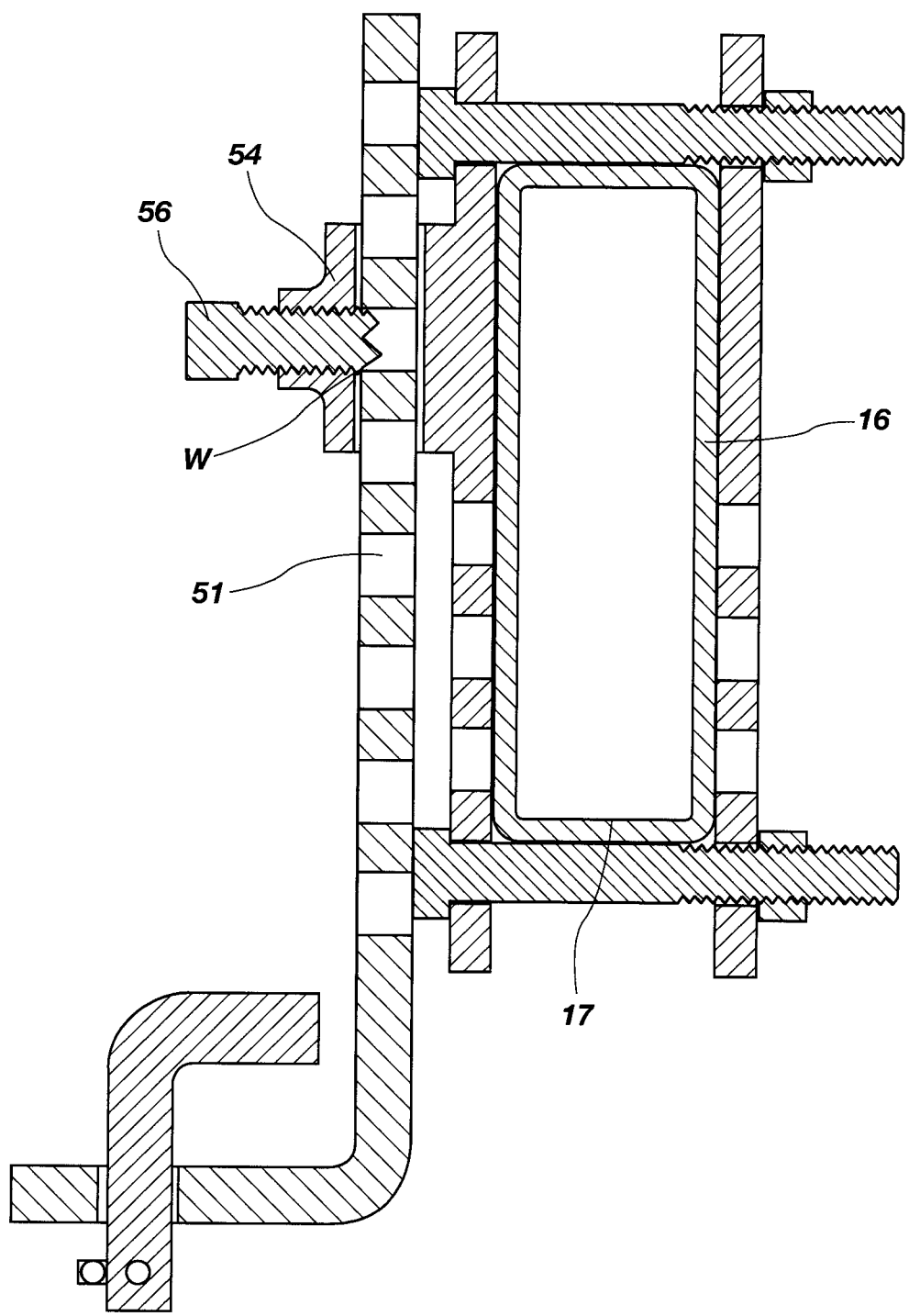
FIG. 6 is a cutaway view of a prior art trailer hitch.
Figure 7:
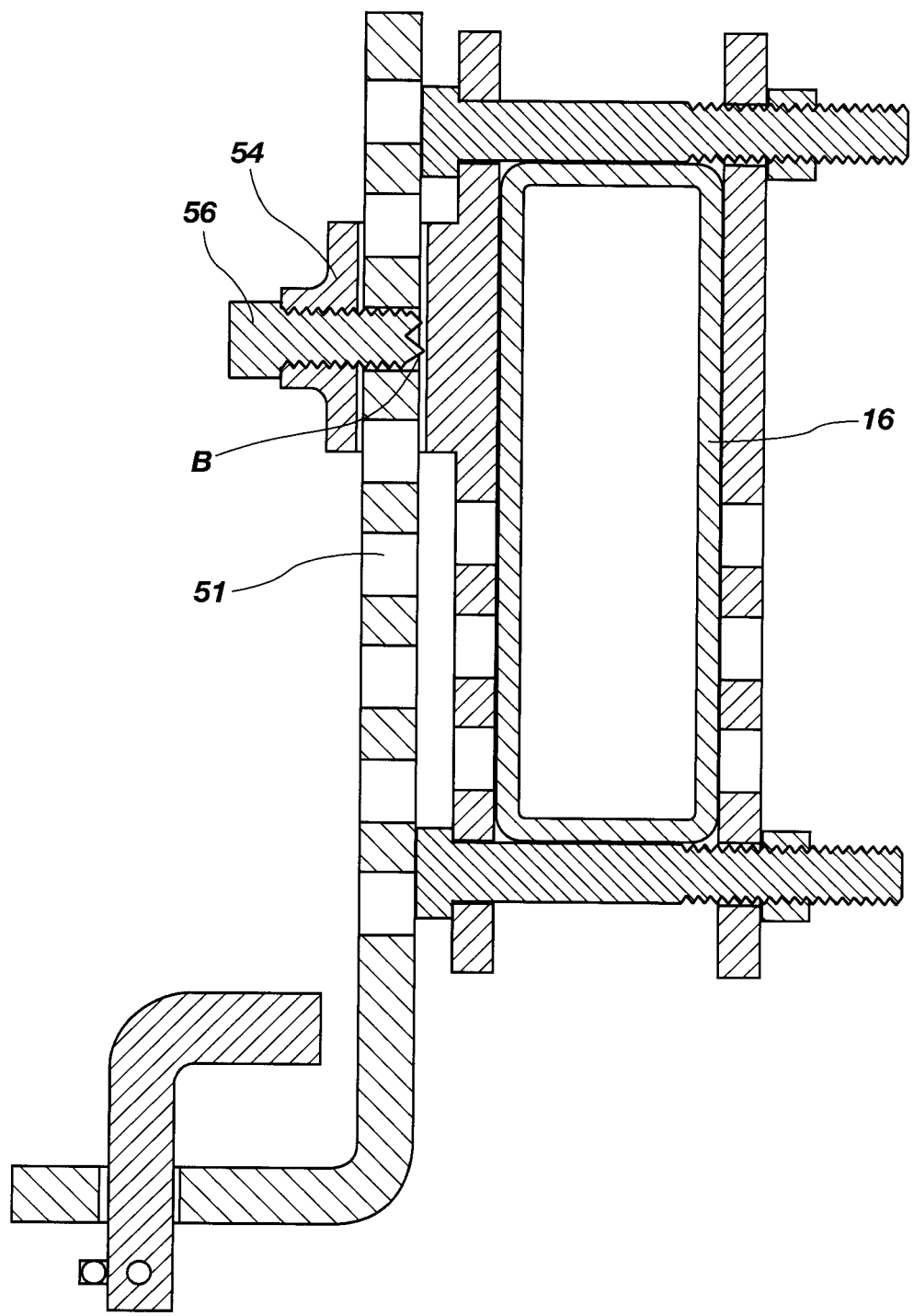
FIG. 7 is a cutaway view of a prior art trailer hitch.
Figure 21:
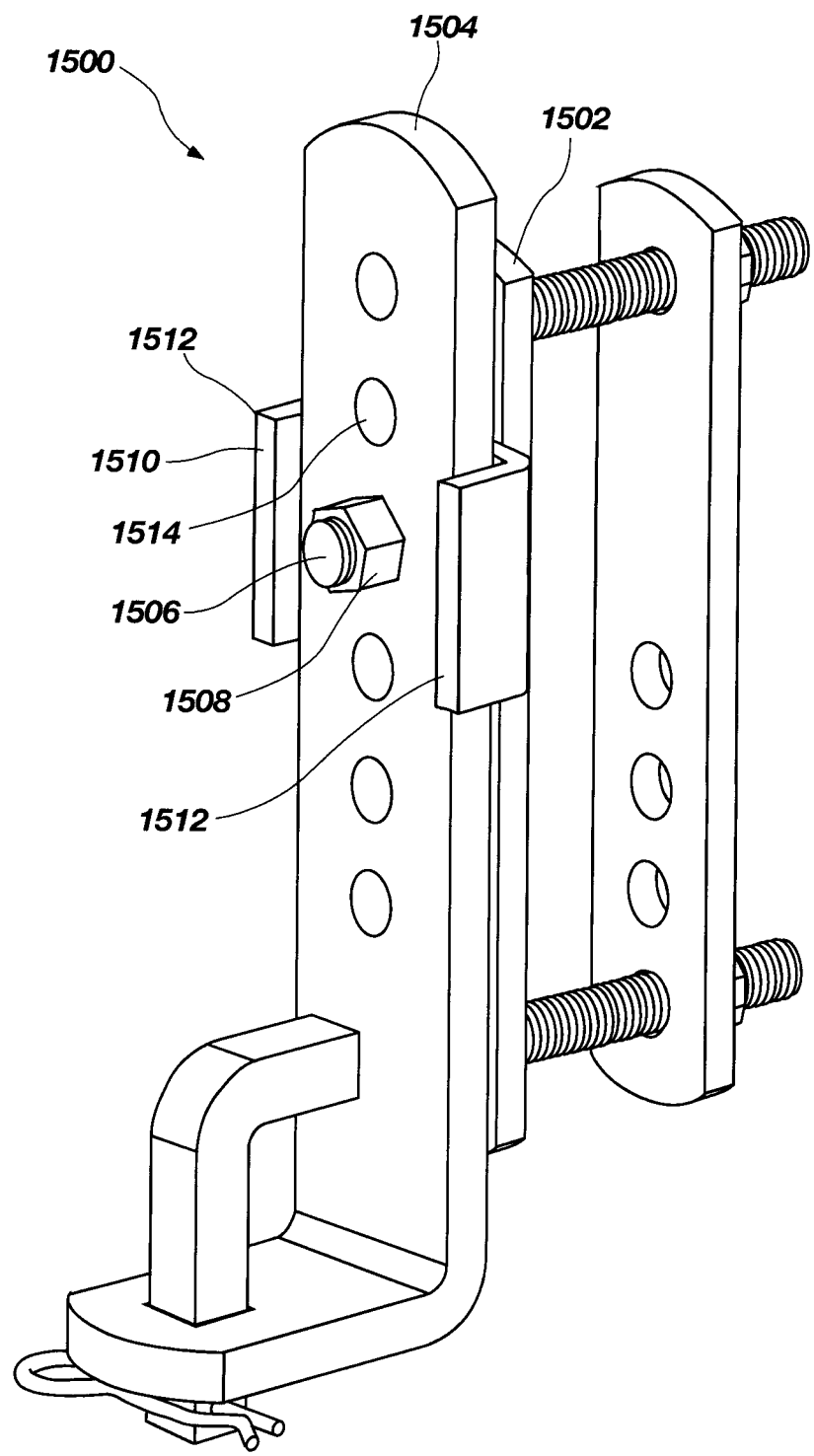
FIG. 21 is yet another alternative embodiment of the trailer hitch system.

The fastening of the bolt 1410 into the threaded hole causes the head of the round-headed bolt 1410 to pull the support member 1404 snug to the back of the attachment member 1402. It will be appreciated that this method allows for more surface area to clamp against as compared to the prior art shown in FIG. 6 (labeled as "W" in the drawing). Referring now to FIG. 21, there is depicted a spring bar support bracket assembly 1500 according to an embodiment of the present disclosure. The assembly 1500 may comprise an attachment member 1502 and a spring bar support member 1504. A stud 1506 may extend from the attachment member 1502. A threaded nut 1508 may engage a free end of the stud 1506. A half-slot 1510 (or even a C-channel) may provide side walls 1512 to limit the pivoting of the support member 1504.

The stud 1506 joining the support member 1504 to the attachment member 1502 may connect to the attachment member 1502, and then extend out like a peg for a hole 1514 in the support member 1504 to fit over or slide onto, after which the threaded nut 1508 may be threaded onto the end of the stud 1506 until snugly clamping the support member 1504 into the attachment member 1510. The stud 1506 may be connected to the attachment member 1502 by any of the means already disclosed above.

Figure 22:
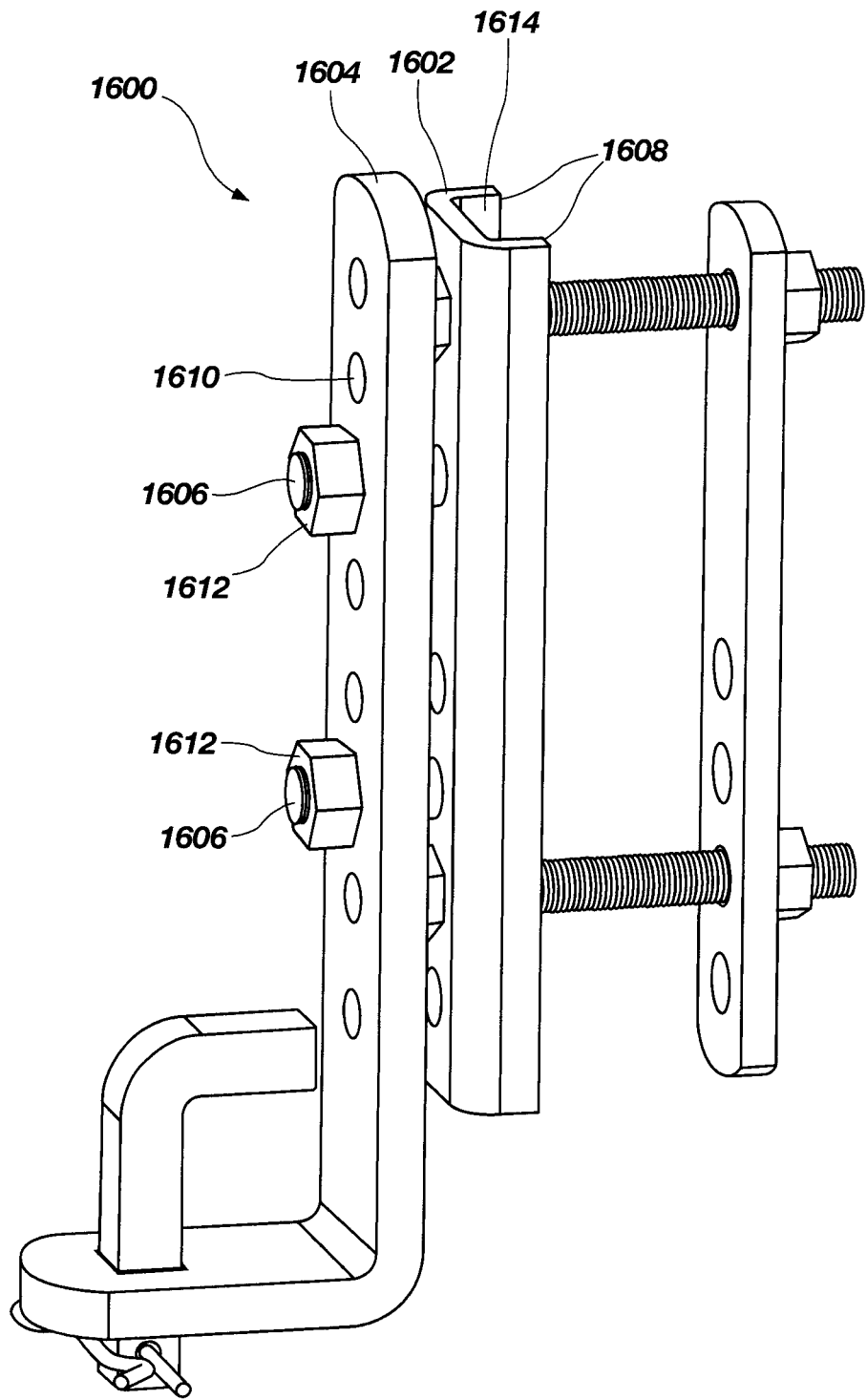
FIG. 22 is still another alternative embodiment of the trailer hitch system.

Referring now to FIG. 22, there is depicted an embodiment of a spring bar support assembly 1600 pursuant to the present disclosure. The assembly 1600 may comprise an attachment member 1602 and a spring bar support member 1604. The attachment member 1602 may be formed with a C-channel cross section while the support member 1604 may have a substantially rectangular cross section. Two studs 1606 may extend from the attachment member 1602 and may be utilized to install the support member 1604 onto the attachment member 1602.

The studs 1606 may be inserted from a side of the attachment member 1602 that is enclosed by side walls 1608, then protrude through the desired holes in the attachment member 1602, then protrude through holes 1610 in the support member 1604. Threaded nuts 1612 may attach to the studs 1606. An elongate cavity 1614 created between the side walls 1608 of the C-channel may create a recessed area for the heads (not shown) of the studs 1606 to reside without interfering with the attachment member 1602 clamping against a frame member of a trailer tongue.

Figure 23:
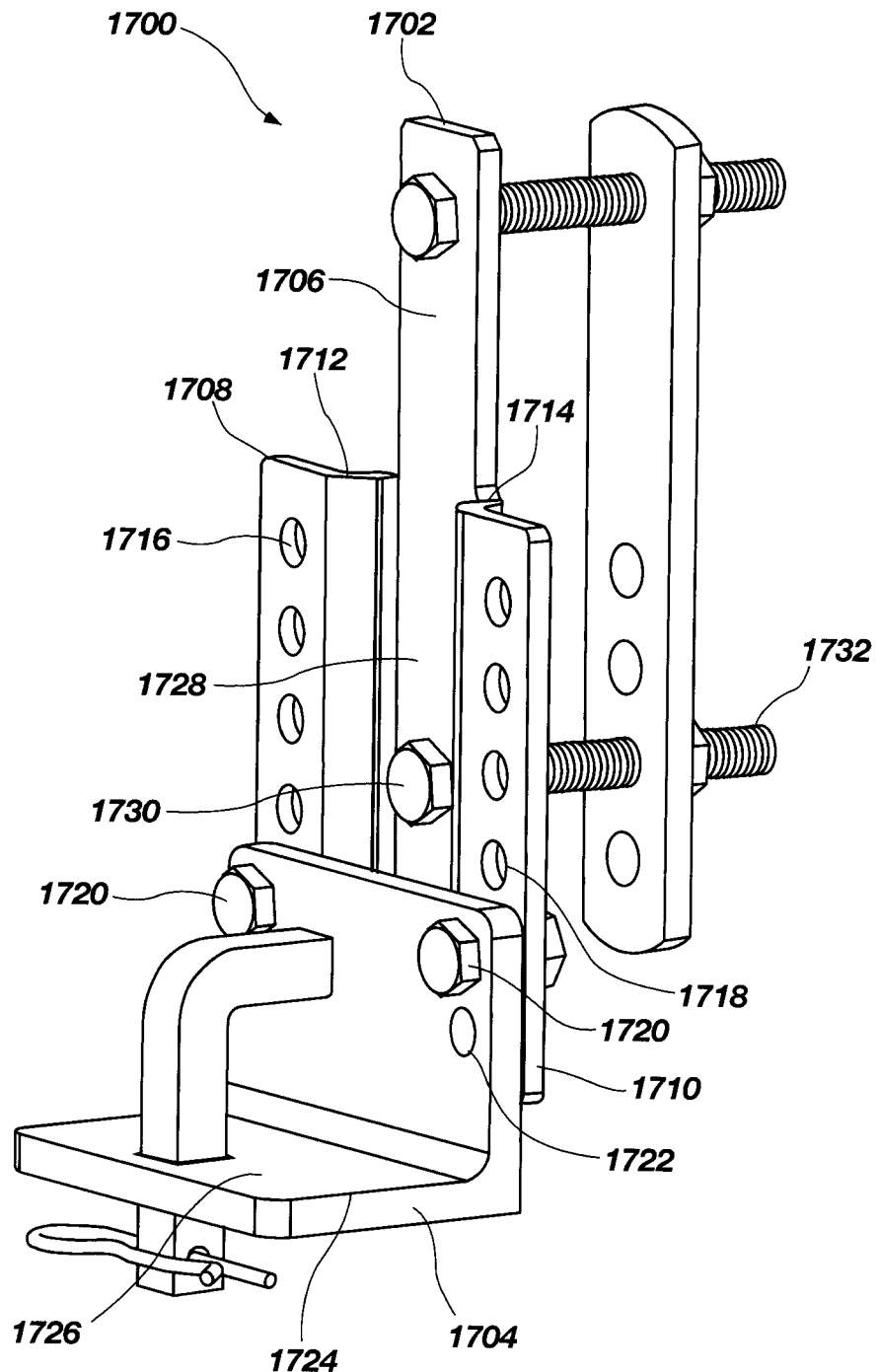
FIG. 23 is yet another alternative embodiment of the trailer hitch system.

Referring now to FIG. 23, an embodiment of a spring bar support assembly 1700 is shown pursuant to the present disclosure. The assembly 1700 may comprise an attachment member 1702 and a support member 1704. The attachment member 1702 may comprise a central portion 1706 and side portions 1708 and 1710. The side portion 1708 may include an offset portion 1712 for forming an offset with the central portion 1706. The side portion 1710 may also include an offset portion 1714 for forming an offset with the central portion 1706. A plurality of openings 1716 and 1718 may be formed in the side portions 1708 and 1710, respectively. Studs 1720 may secure the support member 1704 to the side portions 1708 and 1710 of the attachment member 1702. It will be appreciated that the studs 1720 are horizontally spaced instead of vertically as with the previous embodiments described herein. This horizontal spacing of the studs 1720 may be effective to inhibit rotation of the support member 1704.

An offset mounting hole 1722 may be located on the support member 1704. The purpose of this offset hole 1722 may be to allow for an angled installation of the support member 1704. Depending on the position of the support member 1722 (vertically adjustable), a loaded spring arm (not shown) may approach this support member 1704 at an angle that would focus the friction and wear on an edge 1724 of the support member 1704 instead of across a surface 1726. The placement of the hole 1722 may provide the ability to adjust the angle of the support member 1704 that would help to match the approach angle of the spring Arm to capitalize on a larger surface for friction and wear.

The side portions 1708 and 1710 may form a recessed channel 1728 along the central portion 1706 of the attachment member 1702. The recessed channel 1728 may provide clearance for a head 1730 of a fastener 1732.

It will be understood that the structures disclosed herein may be manufactured using techniques and equipment known to those skilled in the art. For example, the components of the trailer hitch system may be formed using molding, casting, or milling techniques known to those skilled in the art. Those having ordinary skill in the relevant art will appreciate the advantages provided by the features of the present disclosure. For example, it is a feature of the present disclosure to provide a trailer hitch system that is relatively simple in design and manufacture. Another feature of the present disclosure is to provide such a trailer hitch system that reduces trailer sway and equalizes loads. It is a further feature of the present disclosure, in accordance with one aspect thereof, to provide a trailer hitch system having brackets with a plurality of fastening points for improved wear characteristics. It is an additional feature of the present disclosure to provide a trailer hitch system having an aesthetically pleasing appearance. It is another feature of the present disclosure to provide a trunnion and round bar style trailer hitch having rigid brackets that reduce pendulum movement of spring bars. It is an additional feature of the present disclosure to provide a plurality of contact points within a bracket. It is a further feature of the present disclosure to provide a trailer hitch that allows for improved maneuverability while turning the tow vehicle or backing the trailer.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for coupling a trailer tongue to a vehicle, the trailer tongue having a frame member, the system comprising:
    a hitch;
    a spring bar extending from the hitch;
    an attachment member having a first side and a second side;
    at least one non-rotatable stud extending outwardly from the first side of the attachment member and terminating at a free end;
    a mounting assembly for securing the attachment member to the frame member of the trailer tongue such that the at least one non-rotatable stud extends away from the frame member; and
    a support member having a surface adapted to support the spring bar;
    wherein the support member comprises a plurality of openings for selectively engaging the free end of the at least one non-rotatable stud to thereby provide a variable height adjustment for the support member.

2. The system of claim 1, wherein the mounting assembly comprises a pair of fasteners and a back attachment member.

3. The system of claim 1, wherein the support member comprises an L-shape.

4. The system of claim 1, wherein the support member comprises an upward extending portion and a lateral extending portion, and wherein the plurality of openings for selectively engaging the free end of the at least one support stud are distributed along the upward extending portion.

5. The system of claim 1, further comprising a locking member for engaging the free end of the at least one non-rotatable stud to thereby secure the support member between the locking member and the attachment member.

6. The system of claim 5, wherein the locking member comprises a nut.

7. The system of claim 1, wherein the at least one non-rotatable stud comprises two non-rotatable studs.

8. The system of claim 1, wherein a cross-section of the at least one stud is circular.

9. A system for coupling a trailer tongue to a vehicle, the trailer tongue having a frame member, the system comprising:
    a hitch;
    a spring bar extending from the hitch;
    an attachment member having a first side, a second side, and at least one non-rotatable stud extending outward from the first side of the attachment member and terminating at a free end;
    a mounting assembly for securing the attachment member to the frame member of the trailer tongue;
    a support member having a surface configured and adapted to support the spring bar;
    the support member further having a plurality of openings for selectively engaging the free end of the at least one non-rotatable stud to thereby provide a variable height adjustment for the support member with respect to the attachment member; and
    a spacing member;
    wherein the spacing member is interposed between the attachment member and the support member when the support member is mounted on the at least one non-rotatable stud.

10. The system of claim 9, wherein the mounting assembly comprises a pair of fasteners and a back attachment member, each of the fasteners comprising a head and a shaft.

11. The system of claim 10, wherein a thickness of the spacing member is greater than a thickness of the heads of the fasteners.

12. The system of claim 10, wherein a thickness of the spacing member is less than a thickness of the heads of the fasteners.

13. The system of claim 10, wherein a thickness of the spacing member is equal to a thickness of the heads of the fasteners.

14. The system of claim 10, wherein the spacing member comprises a surface for engaging a head of one of the fasteners to thereby hold the fastener non-rotatable.

15. The system of claim 9, wherein the support member comprises an upward extending portion and a lateral extending portion, and wherein the plurality of openings for selectively engaging the free end of the at least one support stud are distributed along the upward extending portion.

16. The system of claim 9, further comprising a locking member for engaging the free end of the stud to thereby secure the support member between the locking member and the attachment member.

17. The system of claim 16, wherein the locking member comprises a nut.

18. The system of claim 9, wherein the at least one stud is held non-rotatable with respect to the attachment member.

19. The system of claim 9, wherein the spacing member comprises at least one opening configured and adapted for receiving the free end of the at least one support stud.

20. The system of claim 9, wherein the attachment member and the spacing member are joined together.

21. The system of claim 9, wherein the at least one stud comprises a head and a shaft, and wherein the spacing member comprises a surface for engaging and holding the head of the at least one stud non-rotatable.

22. A system for coupling a trailer tongue to a vehicle, the trailer tongue having a frame member, the system comprising:
    a hitch;
    a spring bar extending from the hitch;
    an attachment member having a recess;
    a stud having a head, a shaft and a free end, said shaft extending from the head to the free end;
    a bore in communication with the recess of the attachment member, said bore being dimensioned to allow passage of the shaft but not the head of the stud;
    a mounting assembly for securing the attachment member to the frame member of the trailer tongue;
    a support member having a surface configured and adapted to support the spring bar; and
    the support member further having a plurality of openings for selectively engaging the free end of the stud to thereby provide a variable height adjustment for the support member with respect to the attachment member;
    wherein a surface of said recess is configured and dimensioned to engage the head of the stud to prevent the stud from rotating.

23. The system of claim 22, further comprising a spacing member having a first surface and a second surface, wherein said bore extends from the first surface to the second surface of the spacing member.

24. The system of claim 23, wherein said spacing member is joined to the attachment member.

25. The system of claim 23, wherein the mounting assembly comprises a pair of fasteners and a back attachment member, each of the fasteners comprising a head and a shaft, and wherein a thickness of the spacing member is greater than a thickness of the heads of the fasteners.

26. The system of claim 25, wherein the spacing member comprises a surface for engaging a head of one of the fasteners to thereby hold the fastener non-rotatable.

27. The system of claim 22, wherein the support member comprises an upward extending portion and a lateral extending portion, and wherein the plurality of openings for selectively engaging the free end of the stud are distributed along the upward extending portion.

28. The system of claim 22, further comprising a locking member for engaging the free end of the stud to thereby secure the support member between the locking member and the attachment member.

29. The system of claim 28, wherein the locking member comprises a nut.

30. A method for joining a spring bar to a frame member of a trailer tongue, the method comprising:
(a) mounting a pair of non-rotatable studs to the frame member of the trailer tongue such that each of the pair of studs extend outwardly from the frame member of the trailer tongue, each of the studs having a free end;
(b) selecting two of a plurality of openings on a support member that correspond to a desired height of the support member;
(c) installing the support member onto the pair of studs by inserting the studs into the two selected openings;
(d) securing the support member; and
(e) loading the spring bar onto a surface of the support member.

31. The method of claim 30, further comprising installing a spacing member between the frame member of the trailer tongue and the support member.

32. The method of claim 30, wherein the pair of studs extend outwardly from an attachment member, and step (a) further comprises mounting the attachment member to the frame member of the trailer tongue using a mounting assembly.

33. The method of claim 32, wherein the mounting assembly comprises a pair of fasteners and a back attachment member.

34. The method of claim 30, wherein step (d) further comprises installing locking members onto the studs.

35. The method of claim 34, wherein the locking member comprise nuts.

36. The method of claim 30, further comprising the step of installing each of the studs into a bore in communication with a recess, the recess operable to engage and prevent rotation of the studs.

37. A system for coupling a trailer tongue to a vehicle, the trailer tongue having a frame member, the system comprising:
a hitch;
a spring bar extending from the hitch;
an attachment member having a first side, a second side, a recess and a lower opening and an upper opening;
a pair of studs;
each of the pair of studs comprising a shaft extending from a head and terminating at a free end;
each of the shafts of the pair of studs comprising a threaded portion;
a first pair of threaded nuts, each of the threaded nuts operable to engage the threaded portion of the shaft of one of the pair of studs;
a spacing member disposed on the first side of the attachment member, the spacing member having a pair of bores in communication with the recess of the attachment member;
each of the bores of the spacing member dimensioned to allow passage of the shaft, but not the head, of a stud,
the spacing member being joined to said attachment member;
a mounting assembly for securing the attachment member to the frame member of the trailer tongue, the mounting assembly comprising a pair of fasteners and a back attachment member;
each of the pair of fasteners of the mounting assembly comprising a shaft extending from a head and terminating at a free end;
each of the shafts of the pair of fasteners of the mounting assembly having a threaded portion;
a second pair of threaded nuts, each of the second pair of threaded nuts for engaging the threaded portion of the shaft of one of the fasteners of the mounting assembly;
the back attachment member having a lower opening and an upper opening;
an L-shaped support member having an upward extending portion and a lateral extending portion;
the lateral extending portion of the L-shaped support member having a surface for supporting the spring bar;
a plurality of openings for selectively engaging the free ends of the studs, the plurality of openings being distributed along the upward extending portion of the support member;
wherein the plurality of openings provide a variable height adjustment for the support member with respect to the attachment member;
wherein the shafts of each of the pair of studs extend away from the frame member of the trailer tongue when the shafts are installed into the bores in the spacing member and when the attachment member is mounted on the trailer tongue.

38. A system for coupling a trailer tongue to a vehicle, the trailer tongue having a frame member, the system comprising:
a hitch
a spring bar extending from the hitch;
an attachment member having a first side and a second side;
at least one stud extending outwardly from the first side of the attachment member and terminating at a free end;
a mounting assembly for securing the attachment member to the frame member of the trailer tongue such that the at least one stud extends away from the frame member, the mounting assembly comprising a back attachment member; and
a support member having a surface adapted to support the spring bar;
wherein the support member comprises a plurality of openings for selectively engaging the free end of the at least one stud to thereby provide a variable height adjustment for the support member;

wherein the stud comprises a head and a shaft, and wherein the head of the stud resides between the support member and the back attachment member of the mounting assembly.

39. The system of claim 38, wherein the head of the stud resides between at least a portion of the attachment member and the back attachment member of the mounting assembly.

* * * * *